United States Patent
Liu et al.

(10) Patent No.: US 12,238,071 B2
(45) Date of Patent: Feb. 25, 2025

(54) NETWORK DATASET PROCESSING METHOD AND APPARATUS, COMPUTER DEVICE, AND STORAGE MEDIUM

(71) Applicant: Tencent Technology (Shenzhen) Company Limited, Gangdong (CN)

(72) Inventors: Yan Liu, Guangdong (CN); Yu Liang, Guangdong (CN); Wei Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 202 days.

(21) Appl. No.: 17/975,274

(22) Filed: Oct. 27, 2022

(65) Prior Publication Data

US 2023/0046894 A1 Feb. 16, 2023

Related U.S. Application Data

(63) Continuation of application No. PCT/CN2021/132717, filed on Nov. 24, 2021.

(30) Foreign Application Priority Data

Dec. 30, 2020 (CN) .......................... 202011614811.2

(51) Int. Cl.
*H04L 9/40* (2022.01)
*H04L 41/22* (2022.01)
(52) U.S. Cl.
CPC .......... *H04L 63/0272* (2013.01); *H04L 41/22* (2013.01); *H04L 63/107* (2013.01)
(58) Field of Classification Search
CPC .. H04N 17/02; H04N 19/895; H04N 21/2404; H04N 21/2662; H04N 21/42615;
(Continued)

(56) References Cited

U.S. PATENT DOCUMENTS 7,260,079 B1 * 8/2007 Chapman .............. H04W 28/20
370/335
11,019,376 B2 * 5/2021 Hamrick, Jr. .... H04N 21/64322
(Continued)

FOREIGN PATENT DOCUMENTS

CN 201467149 U 5/2010
CN 104852945 A 8/2015
(Continued)

OTHER PUBLICATIONS

Extended European Search Report for corresponding application No. EP 21913626.4 dated Feb. 13, 2024, 10p.
(Continued)

*Primary Examiner* — Sharif E Ullah
(74) *Attorney, Agent, or Firm* — Crowell & Moring LLP

(57) ABSTRACT

Methods, devices, and non-transitory computer-readable storage media for network dataset processing are provided. An initial user interface in a terminal is generated. The initial user interface is configured to access a network dataset. A network dataset selected from the at least one network dataset is used as a target network dataset in response to selecting the at least one network dataset. A target virtual private network (VPN) node corresponding to the target network dataset is determined in response to an access operation on the target network dataset. An accelerated access channel between the terminal and the target network dataset is established through the target VPN node. The initial user interface is switched to an accelerated user interface. The network data processing information is displayed on the accelerated user interface. The network data processing information indicates that the accelerated access channel is used for accessing the target network dataset.

19 Claims, 13 Drawing Sheets

(58) Field of Classification Search
CPC ............ H04N 21/4347; H04N 21/4348; H04L 65/80; H04L 63/0272; H04L 12/28; H04L 63/029; H04L 63/0428; H04L 63/0442; H04L 63/0869; H04L 69/16; H04L 5/023; G06F 12/0811; G06F 16/9574; G06F 16/9535; G06F 21/6254; G06F 8/65; H04W 4/38; H04W 4/70; H04W 12/069; H04W 12/50; H04W 4/50; H04W 4/80; H04W 76/14; H04W 8/005; H04W 84/12; H04W 16/28; H04W 28/06; H04W 28/20; H04W 72/0446; H04W 72/0453; H04W 72/23; H04W 72/27; H04W 4/00; H04W 8/00; H04W 28/00
USPC .......... 726/15, 2, 21, 36; 713/150, 163, 181; 380/255, 264, 276
See application file for complete search history.

(56) References Cited

U.S. PATENT DOCUMENTS

| | | | | |
|---|---|---|---|---|
| 11,652,615 | B1 * | 5/2023 | Holmström | H04L 9/3271 |
| | | | | 713/171 |
| 11,729,148 | B1 * | 8/2023 | Pabijanskas | H04L 61/5007 |
| | | | | 726/15 |
| 11,818,027 | B2 * | 11/2023 | Mineikis | H04L 43/10 |
| 2003/0028451 | A1 * | 2/2003 | Ananian | G06Q 30/0615 |
| | | | | 705/26.42 |
| 2003/0172145 | A1 * | 9/2003 | Nguyen | H04L 12/185 |
| | | | | 709/223 |
| 2004/0029591 | A1 * | 2/2004 | Chapman | H04W 72/0453 |
| | | | | 455/450 |
| 2006/0200849 | A1 * | 9/2006 | Sundarrajan | H04L 69/163 |
| | | | | 725/110 |
| 2007/0016801 | A1 * | 1/2007 | Bade | H04L 9/3234 |
| | | | | 713/193 |
| 2013/0173970 | A1 * | 7/2013 | Kleveland | G11C 29/50 |
| | | | | 714/710 |
| 2015/0019803 | A1 * | 1/2015 | Miller | G06F 3/0611 |
| | | | | 711/125 |
| 2015/0135246 | A1 * | 5/2015 | Dunne | H04N 21/4347 |
| | | | | 725/109 |
| 2016/0011801 | A1 * | 1/2016 | Goldberg | G06F 3/0655 |
| | | | | 711/114 |
| 2016/0373275 | A1 * | 12/2016 | Al-Asaaed | H04L 45/586 |
| 2017/0090935 | A1 * | 3/2017 | Falsafi | G06F 12/0862 |
| 2019/0166177 | A1 * | 5/2019 | Zhao | G06F 12/0811 |
| 2020/0336464 | A1 * | 10/2020 | Hastings | H04L 9/0841 |
| 2020/0336772 | A1 * | 10/2020 | Hamrick, Jr. | H04L 69/16 |
| 2021/0219017 | A1 * | 7/2021 | Pattison | H04N 21/443 |
| 2021/0219133 | A1 * | 7/2021 | Chu | H04W 4/80 |
| 2022/0060899 | A1 * | 2/2022 | Harding | H04W 12/069 |
| 2023/0188510 | A1 * | 6/2023 | Kaciulis | H04L 9/40 |
| | | | | 713/168 |

FOREIGN PATENT DOCUMENTS

| | | |
|---|---|---|
| CN | 108462622 A | 8/2018 |
| CN | 110300045 A | 10/2019 |
| CN | 110478897 A | 11/2019 |

OTHER PUBLICATIONS

International Search Report of PCT/CN2021/132717 dated Feb. 21, 2022, 9 pages.

First Office Action issued on Chinese application CN202011614811.2 on Jun. 29, 2023, 9 pages.

\* cited by examiner

NETWORK DATASET PROCESSING METHOD AND APPARATUS, COMPUTER DEVICE, AND STORAGE MEDIUM

RELATED APPLICATION

The present application is a continuation of PCT application PCT/CN2021/132717 filed Nov. 24, 2021, which claims priority to Chinese Patent Application No. 202011614811.2, entitled "NETWORK DATASET PROCESSING METHOD AND APPARATUS, COMPUTER DEVICE, AND STORAGE MEDIUM", filed on Dec. 30, 2020, which is incorporated herein by reference in its entirety.

FIELD OF THE TECHNOLOGY

The examples of the present subject matter relate to the field of computer networks, and to a network dataset processing method and apparatus, a computer device, and a non-transitory computer-readable storage medium.

BACKGROUND

Due to differences in geographic regions, network datasets in some regions may not be accessed or may only be accessed at a low speed. In related technologies, users will purchase some virtual private network (VPN) services provided by third parties. When a user needs to access network datasets in a region to be accessed, the user may first open VPN services to establish a connection with network nodes in the region, and then tap the APP/website of third-party network datasets, so as to access the network datasets in the region to be accessed by the connected network nodes.

Due to abnormal access of the user, there may be a risk that the above VPN services will be interrupted, resulting in interruption of reasonable access by other users.

BRIEF SUMMARY

The examples of the present subject matter provide a network dataset processing method and apparatus, a computer device, and a non-transitory computer-readable storage medium.

A network dataset processing method may be performed by a terminal, and the method includes: generating an initial user interface in the terminal, the initial user interface being configured to access at least one extra-region network resource; using a network dataset selected from the at least one network dataset as a target network dataset in response to a selecting operation on the at least one network dataset; determining a first target virtual private network (VPN) node corresponding to the target network dataset in response to an access operation on the target extra-region network resource, and establishing a first accelerated access channel between the terminal and the target network dataset through the first target VPN node; and switching the initial user interface to a first accelerated user interface, first network data processing information being displayed on the first accelerated user interface, and the first network data processing information being used for indicating that the first accelerated access channel may be being used for accessing the target network dataset.

A network dataset processing apparatus includes: a display module configured to generate an initial user interface in the terminal, the initial user interface being configured to access at least one network dataset; and a processing module configured to use a network dataset selected from the at least one network dataset as a target network dataset in response to a selecting operation on the at least one network dataset; and determining a first target virtual private network (VPN) node corresponding to the target network dataset in response to an access operation on the target network dataset, and establishing a first accelerated access channel between the terminal and the target network dataset through the first target VPN node; and the display module may be further configured to switch the initial user interface to a first accelerated user interface, first network data processing information may be displayed on the first accelerated user interface, and the first network data processing information may be used for indicating that the first accelerated access channel may be being used for accessing the target network dataset.

A computer device includes a memory and one or more processors, where the memory stores computer-readable instructions. The computer-readable instructions, when executed by the processors, causes the one or more processors to perform the following steps: generating an initial user interface in the terminal, the initial user interface being configured to access at least one network dataset; using a network dataset selected from the at least one network dataset as a target network dataset in response to a selecting operation on the at least one network dataset; determining a first target virtual private network (VPN) node corresponding to the target network dataset in response to an access operation on the target network dataset, and establishing a first accelerated access channel between the terminal and the target network dataset through the first target VPN node; and switching the initial user interface to a first accelerated user interface, first network data processing information being displayed on the first accelerated user interface, and the first network data processing information being used for indicating that the first accelerated access channel may be being used for accessing the target network dataset.

One or more non-volatile readable storage media storing computer-readable instructions may be provided. The computer-readable instructions, when executed by one or more processors, cause the one or more processors to perform the following steps: generating an initial user interface in the terminal, the initial user interface being configured to access at least one network dataset; using a network dataset selected from the at least one network dataset as a target network dataset in response to a selecting operation on the at least one network dataset; determining a first target virtual private network (VPN) node corresponding to the target network dataset in response to an access operation on the target network dataset, and establishing a first accelerated access channel between the terminal and the target network dataset through the first target VPN node; and switching the initial user interface to a first accelerated user interface, first network data processing information being displayed on the first accelerated user interface, and the first network data processing information being used for indicating that the first accelerated access channel may be being used for accessing the target network dataset.

According to another aspect of the present subject matter, a computer program product or a computer program may be provided. The computer program product or the computer program includes computer instructions, and the computer instructions may be stored in a non-transitory computer-readable storage medium. A processor of a computer device reads the computer instructions from the non-transitory computer-readable storage medium, and executes the computer instructions, causing the computer device to perform the foregoing network dataset processing method.

DETAILED DESCRIPTION

Figure 1:
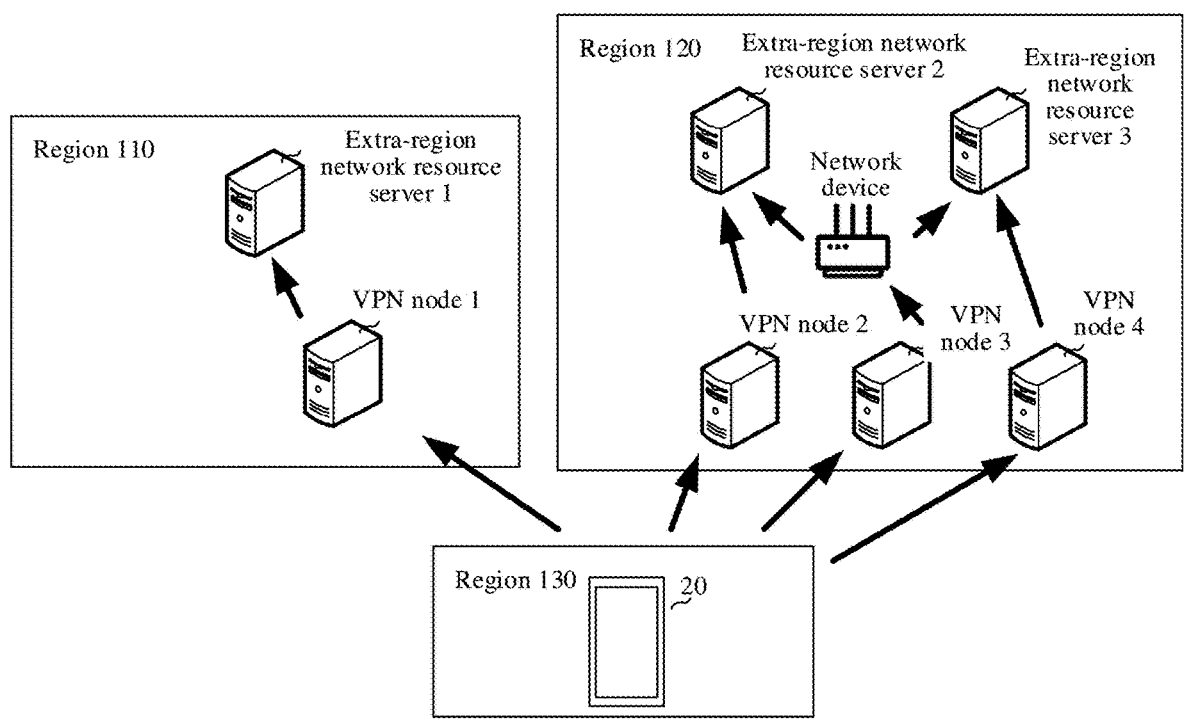
FIG. 1 is a structural block diagram of a computer system provided by an example of the present subject matter.

First, nouns described in examples of the present subject matter may be briefly introduced.

As used herein, network dataset refers to data information and services that may be known, acquired and utilized in a network. In the present subject matter, the network dataset may refer to educational network resources. The educational network resources include, but may not be limited to: at least one of video conference resources, teaching management resources, collaborative tool resources, teaching platform resources, academic journal paper resources, and information forum resources.

More specifically, the network dataset in the examples of the present subject matter includes, but may not be limited to: network resources provided by applications such as Skype (Microsoft instant messaging software), Teams (Microsoft free-edition workplace collaboration software), Zoom (multi-person mobile phone cloud video conference software), Blackboard (digital teaching platform), and Canvas Student (mobile teaching classroom application).

In the present subject matter, the network dataset specifically may be an extra-region network dataset, and the extra-region network dataset refers to a set of network data provided by a server located outside a preset region range. The extra-region refers to a region range that may not be in the same region as a local terminal. In an example, different region ranges may be set according to needs, so that a region that may not be in the same range as a terminal accessing a network dataset may be referred to as an extra-region. For example, a region range may be divided according to countries, so that when a terminal accessing a network dataset may be in a country A, the remaining countries other than the country A may be referred to as an extra-region. For another example, a region range may be divided according to companies, so that when a terminal may not be in a company B, the company B may be referred to as an extra-region, and a network dataset provided by a server of the company B may be referred to as an extra-region network dataset.

As used herein, VPN node refers to at least one transit point for information transmission in a VPN network. In a process of implementing information transmission by a VPN technology, a VPN node processes the transmitted information. For example: when receiving an access data packet sent by a terminal, a VPN node checks a target address; if the target address belongs to an address of a target resource server, the data packet may be encapsulated, and encapsulation manners may be different due to different VPN technologies; and furthermore, the VPN node will construct a new VPN data packet, an encapsulated original data packet may be used as a load of the new VPN data packet, and a target address of the new VPN data packet may be an external address of the target resource server. A processing process of the data packet returned from the target resource server to the terminal may be similar to the above process. Based on the above steps, an information exchange process between the terminal and the target resource server may be implemented. A virtual private network node may be abbreviated as a VPN node.

A VPN network refers to a private network constructed by a VPN technology. The communication between two end points of the VPN network may be encrypted.

VPN technology (virtual private network): refers to a technology of constructing a private network on a public network. Through the VPN technology, the connection between any two end points of the private network does not have an end-to-end physical link required by a traditional private network, but may be a logical network constructed on a network platform provided by a public network service provider, such as the Internet, an Asynchronous Transfer Mode (ATM), and a Frame Relay, and user data may be transmitted in a logical link. A user transmits information through the VPN technology, the information transmission speed may be higher, the efficiency may be higher, the security may be higher, and the stability may be better.

In an example, there may be a VPN node in a VPN network. If a user wants to obtain a foreign resource in a place A, the user sends an instruction 1 to the VPN node through a terminal, the VPN node receives the instruction 1, and the VPN node processes the instruction 1 to obtain an instruction 2 and then sends the instruction 2 to a network dataset server for providing network datasets. The network dataset server receives the instruction 2 and sends feedback information to the VPN node, that is, sends a network dataset, and a process of returning the feedback information may be similar to the above process. Based on the above steps, an information exchange process between the terminal and the network dataset server may be implemented.

In an example, there may be a VPN node and a network device in a VPN network. If a user wants to obtain a foreign network dataset in a place A, the user sends an instruction 1 to the VPN node through a terminal, the VPN node receives the instruction 1, and the VPN node processes the instruction 1 to obtain an instruction 2 and then sends the instruction 2 to the network device. The network device receives the instruction 2 and processes the instruction 2 to obtain an instruction 3, a network dataset server receives the instruction 3 and sends feedback information to the network device, that is, sends a network dataset, and a process of returning the feedback information may be similar to the above process. Based on the above steps, an information exchange process between the terminal and the network dataset server may be implemented.

FIG. 1 shows a structural block diagram of a computer system provided by an example of the present subject matter. The computer system may be divided into three regions, where a region 110 includes a VPN node 1 and a network dataset server 1; a region 120 includes a VPN node 2, a VPN node 3, a VPN node 4, a network device, a network dataset server 2 and a network dataset server 3; and a region 130 includes a terminal 20.

A network dataset acceleration program may be installed and run on the terminal in the region 130. The network dataset acceleration program supports a user to manually select a certain network dataset for accessing, and manually select a VPN node in a certain country or region for accessing.

When the user sends an access request for accessing a network dataset to the region 110 or the region 120 through the terminal 20, on the terminal, the user may first select a target network dataset and then select a VPN node; or, the user may first select a VPN node and then select a target network dataset. But no matter what the selection mode is, after the user selects the target network dataset, the network dataset acceleration program will automatically select an optimal VPN node for the target network dataset to form an optimal line.

In an example, the user selects the data provided by the network dataset server 1 as a target network dataset, and the terminal 20 determines that the VPN node 1 in the region 110 may be an optimal VPN node for connecting to the network dataset server 1.

In an example, the user selects the data provided by the network dataset server 2 as a target network dataset, and the terminal 20 determines an optimal VPN node in the VPN network in the region 120, where the network in the region 120 includes a VPN node 2, a VPN node 3, a VPN node 4 and a network device. Exemplarily, connection channels connecting the network dataset server 2 include the following two types:

First type: the terminal 20 sends an instruction to the VPN node 2, the VPN node 2 receives and processes the instruction to obtain a new instruction and sends the new instruction to the network dataset server 2, and the network dataset server 2 receives the new instruction and returns feedback information, that is, returns a network dataset. A feedback path may be similar to the above process and will not be repeated here.

Second type: the terminal 20 sends an instruction A to the VPN node 3, the VPN node 3 receives and processes the instruction A to obtain a new instruction B and sends the instruction B to the network device, the network device receives and processes the instruction B to obtain a new instruction C and sends the new instruction C to the network dataset server 2, and the network dataset server 2 receives the instruction C and returns feedback information. A feedback path may be similar to the above process and will not be repeated here.

Network devices may exist in multiple connection channels. For example: Terminal-VPN node 3-network device-network dataset server 2, terminal-VPN node 3-network device-network dataset server 3. VPN nodes may exist in multiple connection channels. Since the path of the above VPN node 2 may be more optimal, the network dataset acceleration program will automatically select the VPN node 2 for connection to form an optimal line.

In VPN nodes, technicians set an address set of network dataset servers, and endow the VPN nodes with a function of processing data. In response to a request instruction for accessing a target network dataset sent by the terminal, a VPN node server receives and processes the instruction. Exemplarily, the processing includes, but may not be limited to, the following processes:

After receiving an instruction sent by the terminal 20, the VPN node checks the carried address information of a target network dataset; if the address information may be matched with the address set of network dataset servers stored in the VPN node, the instruction may be encapsulated; and furthermore, the VPN node will construct a new instruction, and an encapsulated original instruction may be used as a load of the new instruction to obtain a new request instruction for accessing a network dataset. A target address of the instruction may be an external address of a target network dataset server. Encapsulation manners may be different due to different VPN technologies, that is, different VPN nodes may use different encapsulation manners.

After completing the processing, the VPN node sends a new request instruction for accessing a network dataset to the network device or the network dataset server.

The VPN node may be connected with the network device through a wireless or wired network, or the VPN node may be connected with the network dataset server through a wireless or wired network.

The network device has functions of receiving, processing and forwarding the instruction sent by the VPN node. In response to the request instruction for accessing the target network dataset sent by the VPN node, the network device receives and forwards the request instruction, and the processing process may be similar to the processing function of the above VPN node and will not be repeated here. After the network device processes the instruction, a new instruction may be sent to the target network dataset server through a wireless or wired network.

In an example, a network device may be used in a case that a VPN node and a target network dataset server may not be directly connected, to relay the data between the VPN node and the target network dataset server.

In response to a request instruction for accessing a target network dataset sent by the VPN node or the network device, the network dataset server receives the instruction and sends corresponding feedback information according to the instruction, such as: opening a webpage, turning up the volume, and playing an online course. Then, the network dataset server sends the feedback information, and the process of the feedback information from the target network dataset server to the terminal may be similar to the process of the request instruction for accessing a network dataset from the terminal to the target network dataset server, and will not be repeated.

Device types of the terminal 20 include: at least one of a smartphone, a tablet computer, an e-book reader, an MP3 player, an MP4 player and a laptop portable computer, or a desktop computer. A person skilled in the art may learn that there may be more or fewer terminals. For example, there may be only one terminal, or there may be dozens of or hundreds of terminals 20 or more. The quantity and the device type of the terminals 20 may not be limited in the example of the present subject matter.

The above VPN node may be a server, a server cluster composed of multiple servers, a physical server device, or a cloud server, which may not be limited in the examples of the present subject matter.

The above network dataset server may be a server, a server cluster composed of multiple servers, a physical server device, or a cloud server, which may not be limited in the examples of the present subject matter.

The above network device may be a switch, a router, a base station, a server, or other devices with a network communication capability, which may not be limited in the examples of the present subject matter.

Figure 2:
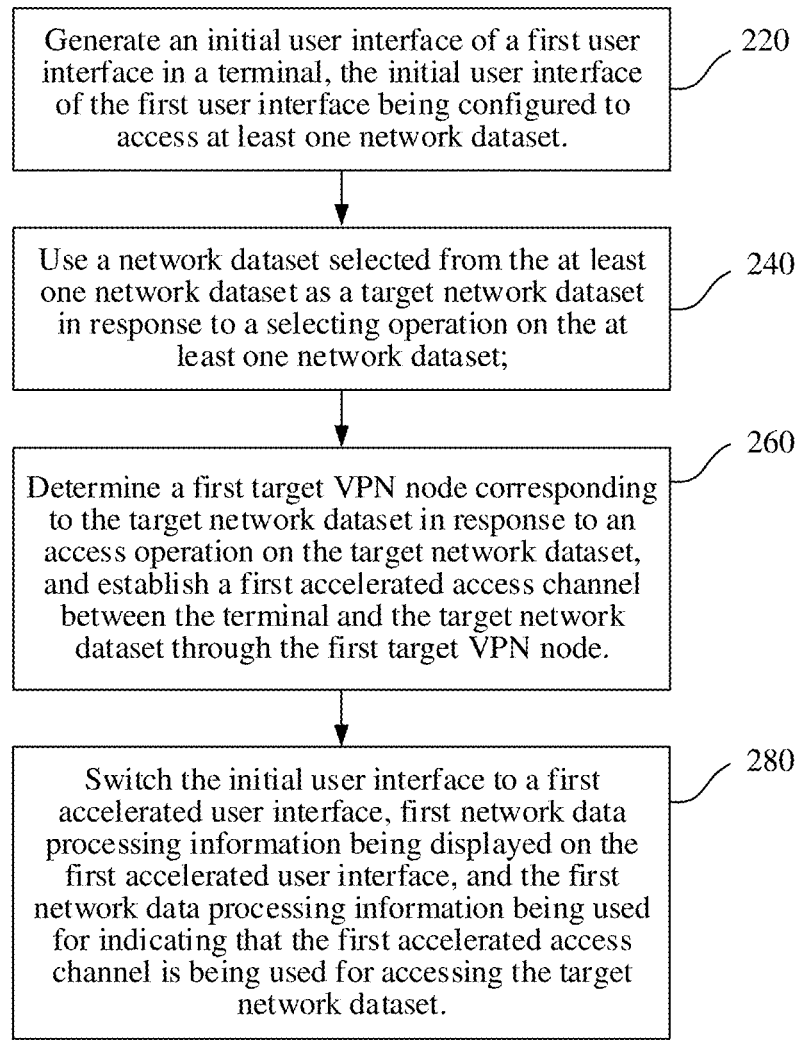
FIG. 2 is a flowchart of a network dataset processing method provided by an example of the present subject matter.

FIG. 2 is a flowchart of a network dataset processing method provided by an example of the present subject matter. The method may be applied to the terminal as shown in FIG. 1 for description. As shown in FIG. 2, the method includes:

Step 220: Generate an initial user interface in the terminal, the initial user interface being configured to access at least one network dataset.

Figure 3:
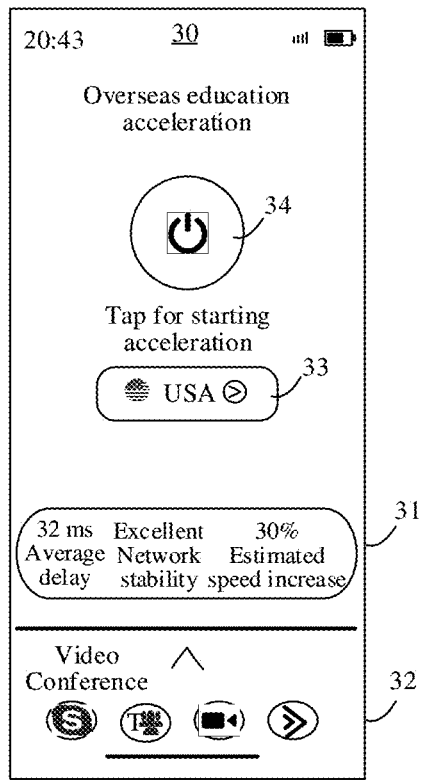
FIG. 3 is a schematic diagram of an initial user interface provided by an example of the present subject matter.

In response to a user operation of opening a network data acceleration program, the terminal displays an initial user interface of the network data acceleration program. Exemplarily, as shown in FIG. 3, an initial user interface 30 includes a real-time network status information region 31, a network dataset region 32, an accelerable region selecting control 33, and an acceleration control 34.

The real-time network status information region 31 displays real-time network status information on the initial user interface.

The real-time network status information region 31 includes: an average delay of the current network, network stability and estimated speed increase.

The real-time network status information may be a network status obtained by measuring the current network (not connected to a VPN network) by the network data acceleration program.

The initial user interface further includes a network dataset region 32, and the network dataset region 32 includes at least two network datasets belonging to a white list. Optionally, an upward display control and a left and right display control may be further displayed on the network dataset region 32, and network datasets displayed in the network dataset region may be adjusted through the upward display control and the left and right display control. In the initial user interface shown in FIG. 3, the network datasets included in the network dataset region may be only part of the network datasets. Exemplarily, a user selects a target network dataset from the network dataset region 32 by a touch operation, based on this, a terminal automatically selects and displays VPN nodes corresponding to the target network dataset, and at least two VPN nodes corresponding to the target network dataset may be different.

The target network dataset includes at least one of the following resource data: video conference extra-region network resources, teaching management resources, collaborative tool resources, teaching platform resources, academic journal paper resources, and information forum resources. The present subject matter does not limit the type of the target network dataset.

The upward display control and the left and right display control in the network dataset region 32 may be configured to display more network datasets. In response to the touch operation of the user on the upward display control, the network dataset region correspondingly expands upward, and the expanded region covers or updates all or part of the region of the original initial user interface.

In response to a slide operation of the user on the left and right display control, the network dataset region correspondingly expands and retracts left and right, and the region obtained by expansion and the region lost by retraction have the same area and the same shape, thereby displaying more network datasets.

In an example, an accelerable region selecting control 33 may be further displayed on the initial user interface. A selected accelerable region may be switched through the accelerable region selecting control 33, where the accelerable region refers to a region with VPN nodes. The accelerable region selecting control 33 has multiple expression modes. In an example, options on the accelerable region selecting control may be expressed as a pattern formed by combining flags of countries and names of countries. In an example, the accelerable region selecting control may be expressed as a flag of a country. In an example, the accelerable region selecting control may be expressed as a name of a country. In an example, the accelerable region selecting control may be expressed as a name of a region. In an example, the accelerable region selecting control may be expressed as a name of a VPN node, which may not be limited in the present subject matter.

Figure 4:
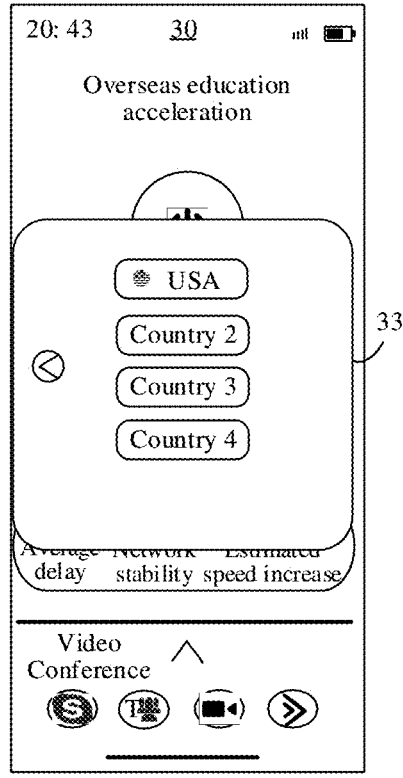
FIG. 4 is a diagram of an interface of an unfolded status of an accelerable region selecting control provided by an example of the present subject matter.

In response to a touch operation of the user on the accelerable region selecting control 33, the terminal displays an unfolded status of the accelerable region selecting control 33. FIG. 4 is a diagram of an interface of an unfolded status of an accelerable region selecting control provided by an example of the present subject matter. In response to a selecting operation on an accelerable region selecting control, an accelerable region (or a VPN node) may be switched to the other accelerable region, and the other accelerable region may be an acceleration region selected by the selecting operation. Options of multiple accelerable regions may be displayed on the accelerable region selecting control 33 in an unfolded status. A user may select one of the accelerable regions, where the accelerable region may be a country or a region. The user may also slide upward or downward to display options of more accelerable regions (or VPN nodes), which will not be repeated here. Each accelerable region corresponds to at least one VPN node.

Optionally, the initial user interface further includes an acceleration control 34. In response to a touch operation of the user on the acceleration control, the network data acceleration program establishes a first accelerated access channel with a VPN node in a selected accelerable region. Exemplarily, when the initial user interface displays an accelerable region selecting control expressed as an American flag and "USA", the user taps the acceleration control, and then, the network data acceleration program may be connected to a VPN node located in the USA. The terminal sends a request instruction for accessing a network dataset to the VPN node located in the USA to establish a first accelerated access channel, to finally realize the connection between the terminal and the target network dataset server through the first accelerated access channel located in the USA.

In an example, after the network data acceleration program may be started, no VPN nodes in accelerable regions may be connected by default.

Step 240: Use a network dataset selected from the at least one network dataset as a target network dataset in response to a selecting operation on the at least one network dataset.

Step 260: Determine a first target VPN node corresponding to the target network dataset in response to an access operation on the target network dataset, and establish a first accelerated access channel between the terminal and the target network dataset through the first target VPN node.

The terminal may use a network dataset selected by the user as a target network dataset in response to a selecting operation of the user on the at least one network dataset, determine a first target VPN node corresponding to the target network dataset in response to an access operation of the user on the target network dataset, and establish a first accelerated access channel through the first target VPN node. Compared with a conventional mode of directly accessing a target network dataset, by accessing the target network dataset through the first accelerated access channel, the access rate of the target network dataset may be increased.

The determine a first target VPN node corresponding to the target network dataset in response to an access operation on the target network dataset includes: determine at least two VPN nodes in response to an access operation on the target network dataset, and select a first target VPN node corresponding to the target network dataset from the at least two VPN nodes.

Multiple network datasets belonging to a white list may be displayed in the initial user interface of the network data acceleration program. In other words, icons of multiple network datasets belonging to a white list may be displayed. The white list may be a list set according to supervision requirements, and network datasets meeting the supervision requirements may be added to the white list.

In response to an access operation of the user on the target network dataset, the network data acceleration program automatically determines a first target VPN node corresponding to the target network dataset from the at least two VPN nodes, and establishes a first accelerated access channel with the target network dataset. In an example, the access operation may be at least one of a tap operation, a double-tap operation, a pressure touch operation, a suspended touch operation, or a slide operation on the target network dataset. For example, the user may trigger the network data acceleration program by double-tapping the target network dataset in the initial user interface, to establish a first accelerated access channel between the terminal and the target network dataset server for providing the target network dataset through the first target VPN node. For another example, the user may also trigger an access operation on the target network dataset by tapping the acceleration control 34 in the first interface, to enable the network data acceleration program to automatically establish a first accelerated access channel. After determining the target network dataset through the network dataset region 32, the user may tap the acceleration control 34, so that the network data acceleration program automatically establishes a corresponding first accelerated access channel through the first target VPN node.

In an example, the network data acceleration program establishes a first accelerated access channel with the target network dataset in response to an access operation on the target network dataset in the at least one network dataset, and performs network acceleration processing through the first accelerated access channel in response to a trigger operation on the acceleration control 34, where the network acceleration refers to improving the access efficiency of the network dataset, and performing the network acceleration processing through the first accelerated access channel refers to increasing the access rate of the target network dataset through the first accelerated access channel. The first accelerated access channel may be a network dataset access channel based on a VPN. For example, the user may select a target network dataset through an access operation in the network dataset region 32, and at this time, the network data acceleration program determines a first target VPN node corresponding to the target network dataset in response to the access operation, and establishes a first accelerated access channel between the target network dataset and the first target VPN node. When the user desires network acceleration, the user may tap the acceleration control 34 to enable the network data acceleration program to perform network acceleration processing through the established first accelerated access channel, thereby increasing the access rate of the target network dataset.

In an example, after determining the first target VPN node corresponding to the target network dataset, the network data acceleration program may be automatically connected to the first target VPN node, to form a first accelerated access channel for accessing the target network dataset.

In an example, the target network dataset specifically may be a target extra-region network dataset. The terminal may determine at least two VPN nodes in response to an access operation on the target extra-region network dataset, and select a first target VPN node corresponding to the target extra-region network dataset from the at least two VPN nodes.

Step 280: Switch the initial user interface to a first accelerated user interface, first network data processing information being displayed on the first accelerated user interface, and the first network data processing information being used for indicating that the first accelerated access channel may be being used for accessing the target network dataset.

Figure 5:
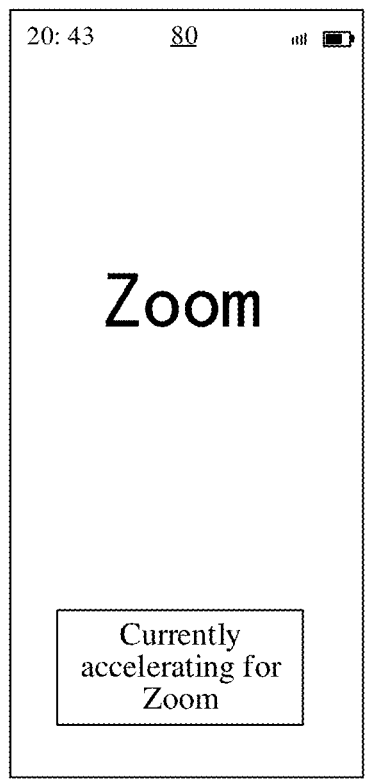
FIG. 5 is a schematic diagram of a first accelerated user interface provided by an example of the present subject matter.

The first network data processing information may be displayed on the first accelerated user interface. FIG. 5 is a schematic diagram of a first accelerated user interface provided by an example of the present subject matter. As shown in FIG. 5, assuming that a target network dataset selected by the user may be a Zoom application, that is, assuming that an application for providing a target network dataset selected by the user may be a Zoom application, correspondingly, a first accelerated user interface 80 may be a user interface of the Zoom application, and the first accelerated user interface 80 displays the first network data processing information "currently accelerating for Zoom". The first network data processing information may be used for indicating that the first accelerated access channel may be being used for performing network acceleration for the target network dataset, where the network acceleration refers to increasing the access rate of the target network dataset, for example, increasing the download rate of the target network dataset, or increasing the upload rate of the target network dataset.

In an example, the first network data processing information includes at least one of the following information: a country where the first target VPN node may be located, a region where the first target VPN node may be located, a connected duration of the first target VPN node, an accelerated duration of the first target VPN node, an acceleration performance of the first target VPN node, a network speed value of the first target VPN node, a delay value of the first target VPN node, a network stability grade of the first target VPN node, a used traffic of the first target VPN node, a node name of the first target VPN node, and an IP address of the first target VPN node.

In an example, the network dataset specifically may be an extra-region network dataset. Step 220 may specifically include: generate an initial user interface of a network data acceleration processing function in the terminal, the initial user interface being configured to access at least one extra-region network dataset belonging to a white list. Step 240 may specifically include: use an extra-region network dataset selected from the at least one extra-region network dataset as a target extra-region network dataset in response to a selecting operation on the at least one extra-region network dataset. Step 260 may specifically include: determine a first target VPN node corresponding to the target extra-region network dataset in response to an access operation on the target extra-region network dataset, and establish a first accelerated access channel between the terminal and the target extra-region network dataset through the first target VPN node. Step 280 may specifically include: switch the initial user interface to a first accelerated user interface for accessing the target extra-region network dataset, first network data processing information being displayed on the first accelerated user interface, and the first network data processing information being used for indicating that the first accelerated access channel may be being used for accessing the target network dataset.

In conclusion, according to the method provided by this example, by setting network datasets in the network data acceleration program and setting a corresponding VPN node for each network dataset, when the user wants to access the target network dataset, the initial user interface may be switched to the first accelerated user interface of the target network dataset, so as to increase the access rate of the target network dataset. Since the access rate of the target network dataset may be increased, the power resources and computing resources consumed due to a low access rate may further be saved. The network data acceleration program meets network supervision requirements, may stably access the target network dataset, and may facilitate the user to directly connect the target network dataset to directly access the target network dataset, so that the access stability and access efficiency when the user accesses the target network dataset may be improved. Since the target network dataset may be accessed stably, computer access resources consumed due to unstable access may further be saved.

Figure 6:
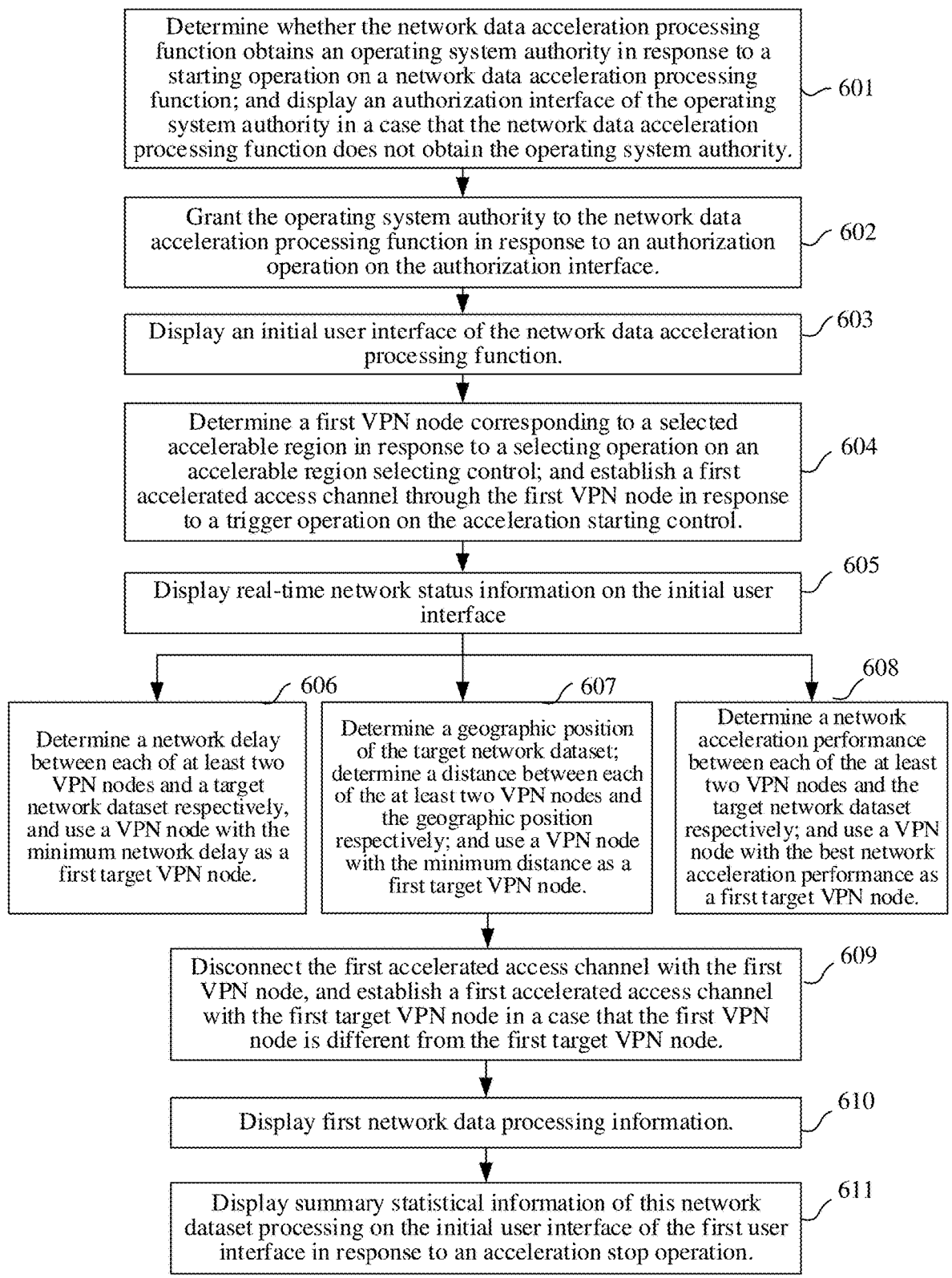
FIG. 6 is a flowchart of a network dataset processing method provided by another example of the present subject matter.

FIG. 6 is a flowchart of a network dataset processing method provided by another example of the present subject matter. The method may be applied to the terminal as shown in FIG. 2 for description. As shown in FIG. 6, the method includes:

Step 601: determine whether the network data acceleration processing function obtains an operating system authority in response to a starting operation on a network data acceleration processing function; and display an authorization interface of the operating system authority in a case that the network data acceleration processing function does not obtain the operating system authority.

In response to a starting operation on the network data acceleration program, in a case that the network data acceleration processing function in the network data acceleration program does not obtain the operating system authority, the authorization interface of the operating system authority may be displayed. Optionally, the operating system authority includes an operating system authority required by the network data acceleration program when running. The operating system authority may be an authority required by the network data acceleration program during running.

Step 602: Grant the operating system authority to the network data acceleration processing function in response to an authorization operation on the authorization interface.

The user may trigger an authorization operation through the authorization interface displayed by the terminal, so that the terminal may grant the operating system authority to the network data acceleration processing function in the network data acceleration program according to the authorization operation. Optionally, the operating system authority includes at least one of a VPN authority, a storage authority and an application survival authority, where the VPN authority may be an authority for accessing VPN services of an operating system, the storage authority may be an authority for accessing a memory, storage configuration files and program files on the terminal, and the application survival authority may be an authority for preventing the network data acceleration program running in the background from being forcibly closed.

Figure 7:
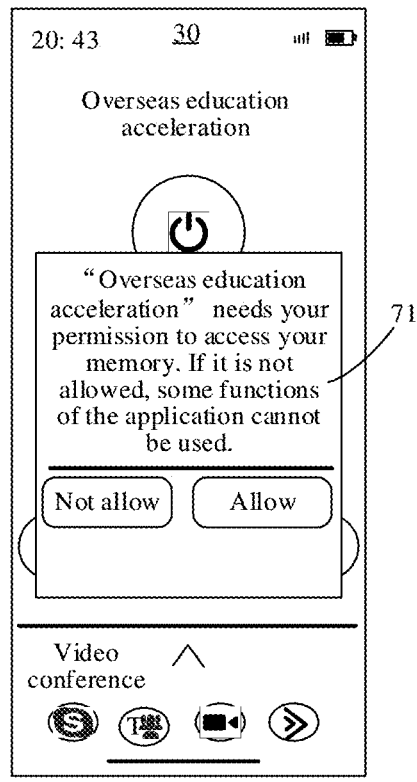
FIG. 7 is a diagram of an authorization interface provided by an example of the present subject matter.

In the example of the present subject matter, in a case that the network data acceleration program does not obtain the operating system authority, an authorization interface 71 may be shown in FIG. 7, FIG. 7 is a diagram of an authorization interface provided by an example of the present subject matter, and the authorization interface 71 may be superimposed on the initial user interface 30 so as to be displayed.

If the operating system authority may be granted to the network data acceleration program in a case that the operating system authority may not be obtained, the network data acceleration program may only perform network dataset processing in a case that the operating system authority may be granted, thereby improving the security of the network dataset processing, and further saving the data processing resources consumed by still performing the network dataset processing under insecure conditions. Furthermore, since the operating system authority includes at least one of a VPN authority, a storage authority, or an application survival authority. Multiple authorities may be provided for the network data acceleration program to further improve the security of performing the network dataset processing through the network data acceleration program based on the multiple authorities.

In some examples, the display time of the authorization interface 71 includes any one of the following conditions:

First, the authorization interface 71 may be displayed before the initial user interface may be displayed, and this example may be illustratively described based on this.

Second, the authorization interface 71 may be displayed after the initial user interface may be displayed.

Third, the display of the authorization interface 71 and the display of the initial user interface may be performed synchronously.

Taking the authorization interface 71 that may be superimposed on the initial user interface 30 to be displayed as an example, the layer where the authorization interface 71 may be located may be an upper layer.

Steps 601 and 602 may be optional steps. In response to a starting operation on the network data acceleration program, in a case that the network data acceleration program obtains the operating system authority, steps 601 and 602 may not be performed.

Step 603: Display an initial user interface of the network data acceleration processing function.

After obtaining the operating system authority, the terminal displays the initial user interface of the network data acceleration program. The initial user interface includes at least two network datasets. The network dataset includes at least one of the following types: video conference extra-region network resources, teaching management resources, collaborative tool resources, teaching platform resources, academic journal paper resources, and information forum resources. The present subject matter does not limit the type of the network dataset.

Step 604: Determine a first VPN node corresponding to a selected accelerable region in response to a selecting operation on the accelerable region selecting control; and establish a first accelerated access channel through the first VPN node in response to a trigger operation on the acceleration starting control.

Step 605: Display real-time network status information on the initial user interface.

A real-time network status information region 310 may be displayed through the initial user interface, and the real-time network status information may be displayed through the real-time network status information region 310, where the real-time network status information includes an average delay of the current network, network stability and estimated speed increase.

The average delay refers to an average duration taken by the terminal sending data to the terminal receiving the corresponding feedback data. In an initial state, since a VPN node may not be connected, the average delay refers to a delay of accessing a network speed testing device through a network which may not be connected with a VPN node, and the network speed testing device may be specified by the network data acceleration program.

The network stability refers to the validity and reliability of the information transmitted by a network system during the network operation. The validity refers to a channel bandwidth and time consumed when transmitting certain information, and the reliability refers to the accuracy of the transmitted information.

The estimated speed increase refers to the estimated increase in transmission rate between the terminal and the network dataset server after and before connecting through the VPN. In an example, for the estimated speed increase of 30%, an example may be taken:

Process A: the terminal sends a request instruction for accessing a network dataset, which may be forwarded to the network dataset server through a VPN node, the network dataset server responds and sends a feedback instruction, which may be forwarded to the terminal through the VPN node, and the terminal receives the feedback instruction.

Process B: the terminal sends a request instruction for accessing a network dataset to the network dataset server, the network dataset server responds and sends a feedback instruction to the terminal, and the terminal receives the feedback instruction.

The time consumed by the process A may be x, the time consumed by the process B may be y, and x=0.7y.

By displaying the real-time network status information through the initial user interface, the processing process of the network dataset may be adjusted in time based on the network status information displayed in real time, thereby reducing the probability that the access rate of the network dataset may be low due to untimely adjustment, and further saving the power and computing resources consumed due to a low access rate of the network dataset.

A way of selecting, by the network data acceleration program, a VPN node for the target network dataset may use at least one of the three ways shown in step 606, step 607 and step 608:

Step 606: Determine a network delay between each of the at least two VPN nodes and the target network dataset respectively, and use a VPN node with the minimum network delay as a first target VPN node.

By using the VPN node with the minimum network delay as the first target VPN node, the access rate of the target network dataset may be increased based on the first target VPN node, thereby saving the power resources consumed due to a low access rate.

The network data acceleration program determines a VPN node with the minimum network delay corresponding to the target network dataset from the at least two VPN nodes as a first target VPN node.

In an example, on the initial user interface, in response to an access operation of the user on selection of a target network dataset in the network dataset region, the terminal sends the information of the target network dataset selected by the user to the network data acceleration program, the network data acceleration program determines the information of an optimal VPN node and feeds the information back to the terminal, and the terminal determines an optimal channel according to the indication of the information.

In an example, there may be a one-to-one correspondence between a target network dataset and an optimal VPN node. Exemplarily, if a target network dataset server may be in the USA, the corresponding optimal VPN node may be a VPN node A located in the USA.

In an example, there may be a many-to-one relationship between target network datasets and an optimal VPN node. Exemplarily, if a target network dataset server may be in the USA, the corresponding optimal VPN node may be a VPN node A located in the USA, and if another target network dataset server may be in Canada, the corresponding optimal VPN node may be still the VPN node A located in the USA.

The network data acceleration program determines a connection channel with the minimum network delay as an optimal channel, and determines a VPN node passing through at this time as an optimal first target VPN node.

In an example, the network data acceleration program stores a first corresponding relationship between "network datasets and VPN nodes", and the first corresponding relationship stores VPN nodes with the minimum network delay corresponding to each network dataset. Based on the first corresponding relationship, the network data acceleration program determines a first target VPN node corresponding to the target network dataset selected by the user. In an example, the network data acceleration program sends an identifier of the target network dataset selected by the user to a background server, and the background server selects a first target VPN node for the target network dataset.

Optionally, the background server may be a server for providing background services for the network data acceleration program.

In an example, step 606 may specifically include: determine a network delay between each of the at least two VPN nodes and a target extra-region network dataset, and use a VPN node with the minimum network delay as a first target VPN node.

Step 607: Determine a geographic position of the target network dataset; determine a distance between each of the at least two VPN nodes and the geographic position respectively; and use a VPN node with the minimum distance as a first target VPN node.

The network data acceleration program determines a VPN node of which the geographic position may be closest to that of the target network dataset from the at least two VPN nodes as a first target VPN node.

By using the VPN node with the minimum distance as the first target VPN node, the access rate of the target network dataset may be increased based on the first target VPN node, thereby saving the power resources consumed due to a low access rate.

In an example, the network data acceleration program stores a second corresponding relationship between "network datasets and VPN nodes", and the second corresponding relationship stores VPN nodes of which the geographic position may be closest to that corresponding to each network dataset. Based on the second corresponding relationship, a first target VPN node corresponding to the target network dataset selected by the user may be determined. In an example, the network data acceleration program sends an identifier of the target network dataset selected by the user to a background server, and the background server selects a first target VPN node for the target network dataset.

Optionally, the background server may be a server for providing background services for the network data acceleration program.

Step 608: Determine a network acceleration performance between each of the at least two VPN nodes and the target network dataset respectively; and use a VPN node with the best network acceleration performance as a first target VPN node.

The network data acceleration program determines a VPN node with the best network acceleration performance corresponding to the target network dataset from the at least two VPN nodes as a first target VPN node.

By using the VPN node with the best network acceleration performance as the first target VPN node, the access rate of the target network dataset may be increased based on the first target VPN node, thereby saving the power resources consumed due to a low access rate.

In an example, the network data acceleration program stores a third corresponding relationship between "network datasets and VPN nodes", and the third corresponding relationship stores VPN nodes with the best network acceleration performance corresponding to each network dataset. Based on the third corresponding relationship, a first target VPN node corresponding to the target network dataset selected by the user may be determined. In an example, the network data acceleration program sends an identifier of the target network dataset selected by the user to a background server, and the background server selects a first target VPN node for the target network dataset. The network acceleration performance refers to a performance of increasing the access rate of a network dataset. When the network acceleration performance of a VPN node may be better, the access rate of the network dataset corresponding to the VPN node may be also better.

Optionally, the background server may be a server for providing background services for the network data acceleration program.

After the first target VPN node corresponding to the target network dataset may be determined, the network data acceleration program automatically connects the first target VPN node.

In an example, step 607 may specifically include: determine a geographic position of a target extra-region network dataset; determine a distance between each of at least two VPN nodes and the geographic position respectively; and use a VPN node with the minimum distance as a first target VPN node.

Step 609: Disconnect the first accelerated access channel with the first VPN node, and establish a first accelerated access channel with the first target VPN node in a case that the first VPN node may be different from the first target VPN node.

The first VPN node may be a VPN node corresponding to a selected accelerable region in response to a selecting operation on the accelerable region selecting control. Referring to FIG. 3, the user may select a first VPN node through the accelerable region selecting control 33 displayed on the initial user interface, so that the network data acceleration program may establish a first accelerated access channel through the first VPN node in response to a trigger operation on the acceleration starting control.

In an example, an accelerable region selecting control and an acceleration starting control may be further displayed on the initial user interface, and the above method includes: determine a first VPN node corresponding to a selected accelerable region in response to a selecting operation on the accelerable region selecting control; and establish a first accelerated access channel through the first VPN node in response to a trigger operation on the acceleration starting control. After selecting a first target VPN node corresponding to the target network dataset from the at least two VPN nodes, the method further includes: disconnect the first accelerated access channel with the first VPN node, and establish a first accelerated access channel with the first target VPN node in a case that the first VPN node may be different from the first target VPN node.

The first virtual private network node may be abbreviated as a first VPN node. An accelerable region selecting control and an acceleration starting control may be further displayed on the initial user interface, and the user may select an accelerable region through the accelerable region selecting control, so that the terminal may determine a first VPN node corresponding to the selected accelerable region in response to a selecting operation on the accelerable region selecting control. When a network needs to be accelerated, the user may touch the acceleration starting control, so that the terminal may establish a first accelerated access channel through the first VPN node in response to a trigger operation on the acceleration starting control. After the first accelerated access channel may be established, the user may further select a target extra-region network resource through the initial user interface, and the terminal may determine a first target VPN node corresponding to the target extra-region network resource, and determine whether the first target VPN node may be consistent with the first VPN node. If the first target VPN node may be consistent with the first VPN node, the established first accelerated access channel may be kept unchanged; and if the first target VPN node may be inconsistent with the first VPN node, the first accelerated access channel with the first VPN node may be disconnected, and a first accelerated access channel with the first target VPN node may be established.

By replacing the first VPN node selected by the user with a better first target VPN node, the access rate of the target network dataset may be further increased based on the better first target VPN node, thereby further saving the power and computing resources consumed due to a low access rate.

Step 610: Display first network data processing information.

The first network data processing information may be used for indicating that the first target VPN node may be connected, and the access rate of the target network dataset may be increased through the first target VPN node.

Figure 8:
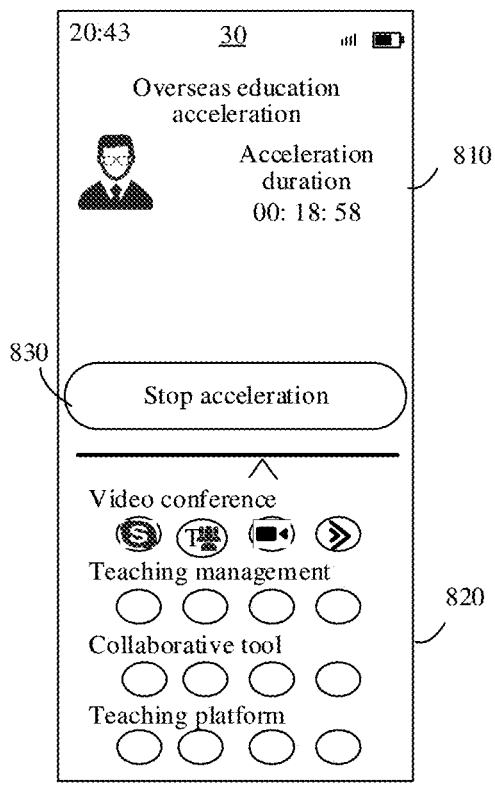
FIG. 8 is a diagram of an interface of first network data processing information provided by an example of the present subject matter.

In an example, first network data processing information may be displayed on the initial user interface. FIG. 8 is a diagram of a display interface of first network data processing information provided by an example of the present subject matter. FIG. 8 shows an initial user interface, including a first network data processing information region 810, a network dataset region 820 and an acceleration stop control 830.

The first network data processing information region 810 may be configured to display first network data processing information, where the first network data processing information includes an acceleration duration, and the acceleration duration refers to a duration that a terminal may be connected to a target resource server through a VPN node.

The network dataset region 820 includes multiple network datasets, only a part of the network datasets may be shown in FIG. 8, and the present subject matter does not limit the type and number of network datasets.

The acceleration stop control 830 may be configured to disconnect the connected VPN node, and based on a touch operation of the user on the acceleration stop control, the terminal receives an instruction for stop acceleration, and disconnects the connection with the first target VPN node.

The first network data processing information may be displayed through the initial user interface, and the processing condition of the network dataset at the current moment may be determined in time based on the first network data processing information, so as to adjust the processing process of the network dataset in time according to the determined processing condition of the network dataset, thereby reducing the probability that the access rate of the network dataset may be low due to untimely adjustment, and further saving the power and computing resources consumed due to a low access rate of the network dataset.

Figure 9:
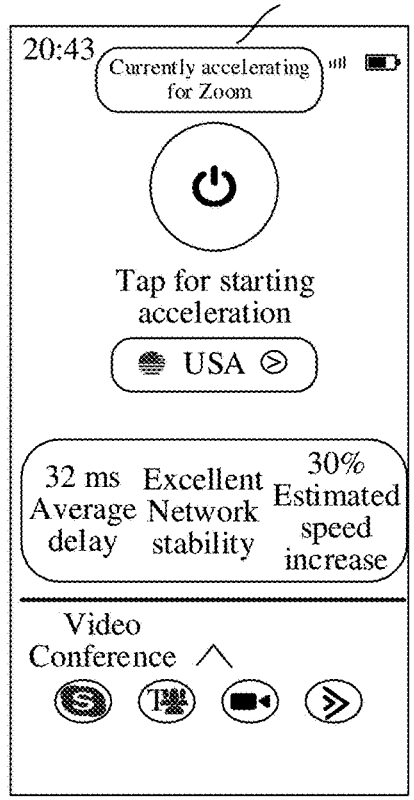
FIG. 9 is a diagram of an interface of first network data processing information provided by another example of the present subject matter.

In an example, first network data processing information may be displayed in a status bar in response to a viewing operation on the status bar. FIG. 9 is a diagram of a display interface of first network data processing information provided by another example of the present subject matter. FIG. 9 is a schematic diagram of an initial user interface 30, including a first network data processing information region 91 in a status bar, where the first network data processing information region 91 displays first network data processing information.

By displaying the first network data processing information in the status bar, it may be convenient for the user to quickly view the first network data processing information, thereby improving the viewing efficiency of the first network data processing information, and further saving the power resources consumed due to low viewing efficiency.

Figure 10:
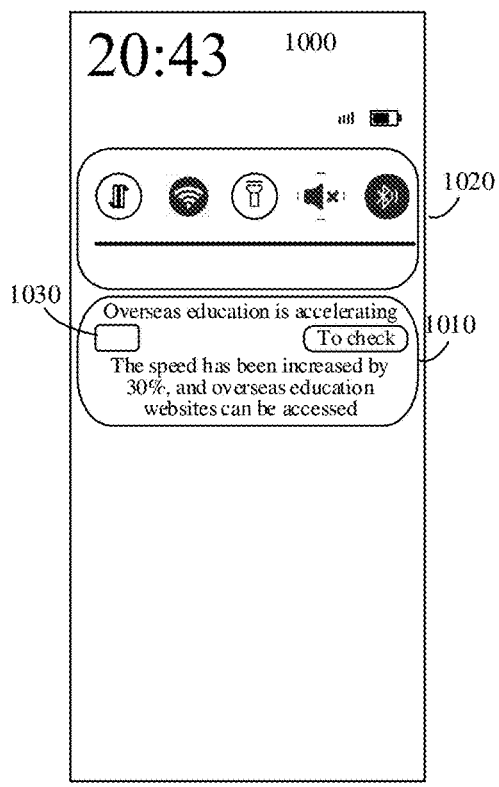
FIG. 10 is a diagram of an interface of first network data processing information provided by another example of the present subject matter.

In an example, first network data processing information may be displayed in a system notification message in response to a viewing operation on the notification message. FIG. 10 is a diagram of a display interface of first network data processing information provided by another example of the present subject matter. FIG. 10 includes a first network data processing information region 1010 and a common control region 1020. A terminal may display first network data processing information through the first network data processing information region 1010 in response to a viewing operation on a notification message.

In an example, an initial user interface may be switched to a first accelerated user interface of a target network dataset, and first network data processing information may be displayed on the first accelerated user interface.

Exemplarily, the display interface of the first network data processing information, as shown in FIG. 10, may further include an icon 1030 of a network data acceleration program.

By displaying the first network data processing information in the system notification message, it may be convenient for the user to quickly view the first network data processing information, thereby improving the viewing efficiency of the first network data processing information, and further saving the power resources consumed due to low viewing efficiency.

Step 611: Display summary statistical information of this network dataset processing on the initial user interface in response to an acceleration stop operation.

When the user touches the acceleration stop control to trigger acceleration stop, the network data acceleration program may summarize the information of this network data processing to obtain summary statistical information, and the summary statistical information may be displayed through the initial user interface. The summary statistical information of the network data processing includes at least one of the following information: a country where the first target VPN node may be located, a region where the first target VPN node may be located, a connected duration of the first target VPN node, an accelerated duration of the first target VPN node, an acceleration performance of the first target VPN node, a network speed value of the first target VPN node, a delay value of the first target VPN node, a network stability grade of the first target VPN node, a used traffic of the first target VPN node, a node name of the first target VPN node, and an IP address of the first target VPN node.

Figure 11:
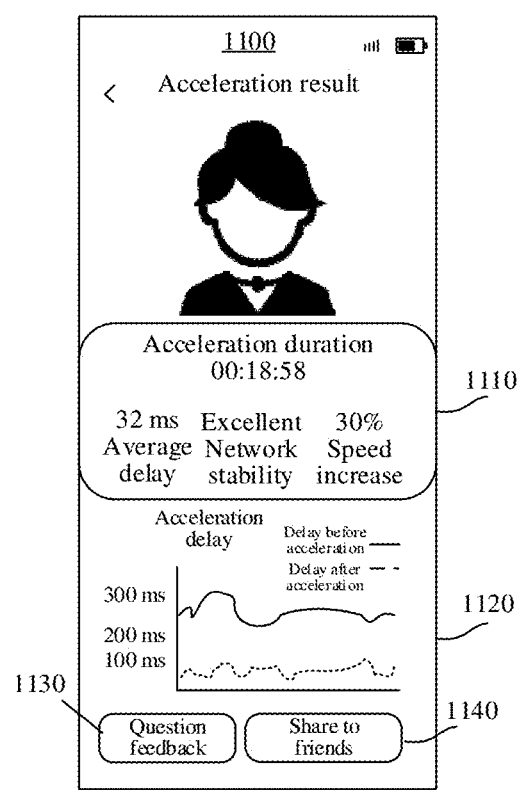
FIG. 11 is a diagram of an interface of summary statistics provided by an example of the present subject matter.

FIG. 11 is a diagram of a display interface of summary information provided by an example of the present subject matter. A display interface 1100 of summary information includes a first network data processing information region 1110, a comparison region 1120 before and after acceleration, a question feedback control 1130 and a share to friends control 1140. The first network data processing information region 1110 includes an accelerated duration and network status information which have been described in detail above. The comparison region 1120 before and after acceleration displays the variation of the network delay before and after acceleration in the form of a broken line graph.

By displaying the summary statistical information of this network data processing, the processing process of the network data may be further optimized based on the displayed summary statistical information, thereby further increasing the access rate of the network data. Since the processing process of the network data may be optimized based on the summary statistical information, the probability of a poor optimization effect caused by random optimization may be reduced, thereby saving the computer resources consumed by random optimization.

In conclusion, according to the method provided by this example, by setting at least two network datasets in the network data acceleration program and setting a corresponding VPN node for each network dataset, when the user wants to access the target network dataset, the initial user interface may be switched to the first accelerated user interface of the target network dataset, so as to increase the access rate of the target network dataset. The network data acceleration program meets network supervision requirements, may stably increase the access rate of the target network dataset, and may facilitate the user to directly connect the target network dataset to directly access the target network dataset, so that the network stability and access efficiency when the user accesses the network dataset may be improved, and the use experience of the user may be greatly improved.

In an example, the above method further includes: monitor a data transmission speed at which the terminal accesses at least one network dataset; determine a second target VPN node in response to a monitoring result of the data transmission speed, and establish a second accelerated access channel between the terminal and the at least one network dataset through the second target VPN node; and switch the initial user interface to a second accelerated user interface, second network data processing information being displayed on the second accelerated user interface, and the second network data processing information being used for indicating that the second accelerated access channel may be being used for accessing the at least one network dataset.

For each network dataset in the at least one network dataset, a computer device may monitor the data transmission speed at which the terminal accesses the current network dataset to obtain a monitoring result, determine a second target VPN node according to the monitoring result of the data transmission speed, and determine whether a second accelerated access channel needs to be established with the current network dataset through the second target VPN node. When the second accelerated access channel needs to be established, the computer device establishes the second accelerated access channel between the terminal and the current network dataset through the determined second target VPN node, and switches the initial user interface to the second accelerated user interface, where second network data processing information may be displayed on the second accelerated user interface, and the second network data processing information may be used for indicating that the second accelerated access channel may be being used for accessing the current network dataset. The second accelerated access channel may be configured to transmit network datasets provided by a resource server to a terminal. Compared with a conventional mode of accessing a network dataset directly by a terminal, by transmitting the network dataset through the second accelerated access channel, the transmission rate of the network dataset may be increased.

Since the second accelerated access channel may be established based on the monitoring result of the data transmission speed, the establishment of an unnecessary second accelerated access channel may be reduced, and the power and computing resources consumed by the establishment of the unnecessary second accelerated access channel may be saved.

In an example, the monitoring result includes one or more of the following conditions: the data transmission speed may be lower than a preset data propagation speed threshold; a duration of the data transmission speed being lower than a preset data propagation speed threshold exceeds a preset time length; and the data transmission speed varies with time, and a variation range of the data transmission speed within a preset time length exceeds a preset value.

For each network dataset in at least one network dataset, the computer device may monitor the data transmission speed at which the terminal accesses the current network dataset to obtain a monitoring result. When the monitoring result corresponding to the current network dataset indicates that the data transmission speed may be lower than a preset data propagation speed threshold, or a duration of the data transmission speed being lower than a preset data propagation speed threshold exceeds a preset time length, or the data transmission speed varies with time, and a variation range of the data transmission speed within a preset time length exceeds a preset value, the computer device determines a second target VPN node corresponding to the current network dataset, and establishes a second accelerated access channel between the terminal and the current network dataset through the second target VPN node.

Since the second accelerated access channel may be established when the data transmission speed may be lower than a preset data propagation speed threshold, or a duration of the data transmission speed being lower than a preset data propagation speed threshold exceeds a preset time length, or the data transmission speed varies with time, and a variation range of the data transmission speed within a preset time length exceeds a preset value, the probability of establishing the second accelerated access channel when the data transmission speed may be higher than a preset data propagation speed threshold, or a duration of the data transmission speed being higher than a preset data propagation speed threshold exceeds a preset time length, or the data transmission speed varies with time, and a variation range of the data transmission speed within a preset time length may be lower than a preset value may be reduced, thereby reducing the probability of establishing an unnecessary second accelerated access channel, and further saving the power and computing resources consumed by establishing the unnecessary second accelerated access channel.

In an example, the data transmission speed includes a data download speed of the at least one network dataset downloaded to the terminal, or a data upload speed of the at least one network dataset uploaded from the terminal, or both the data download speed and the data upload speed.

Since the data transmission speed includes the data download speed and the data upload speed, when the data download speed may be lower than a preset data download speed threshold, or the data upload speed may be lower than a preset data upload speed threshold, a second accelerated access channel may be established, thereby reducing the probability of establishing an unnecessary second accelerated access channel, and further saving the power and computing resources consumed by establishing the unnecessary second accelerated access channel.

Figure 12:
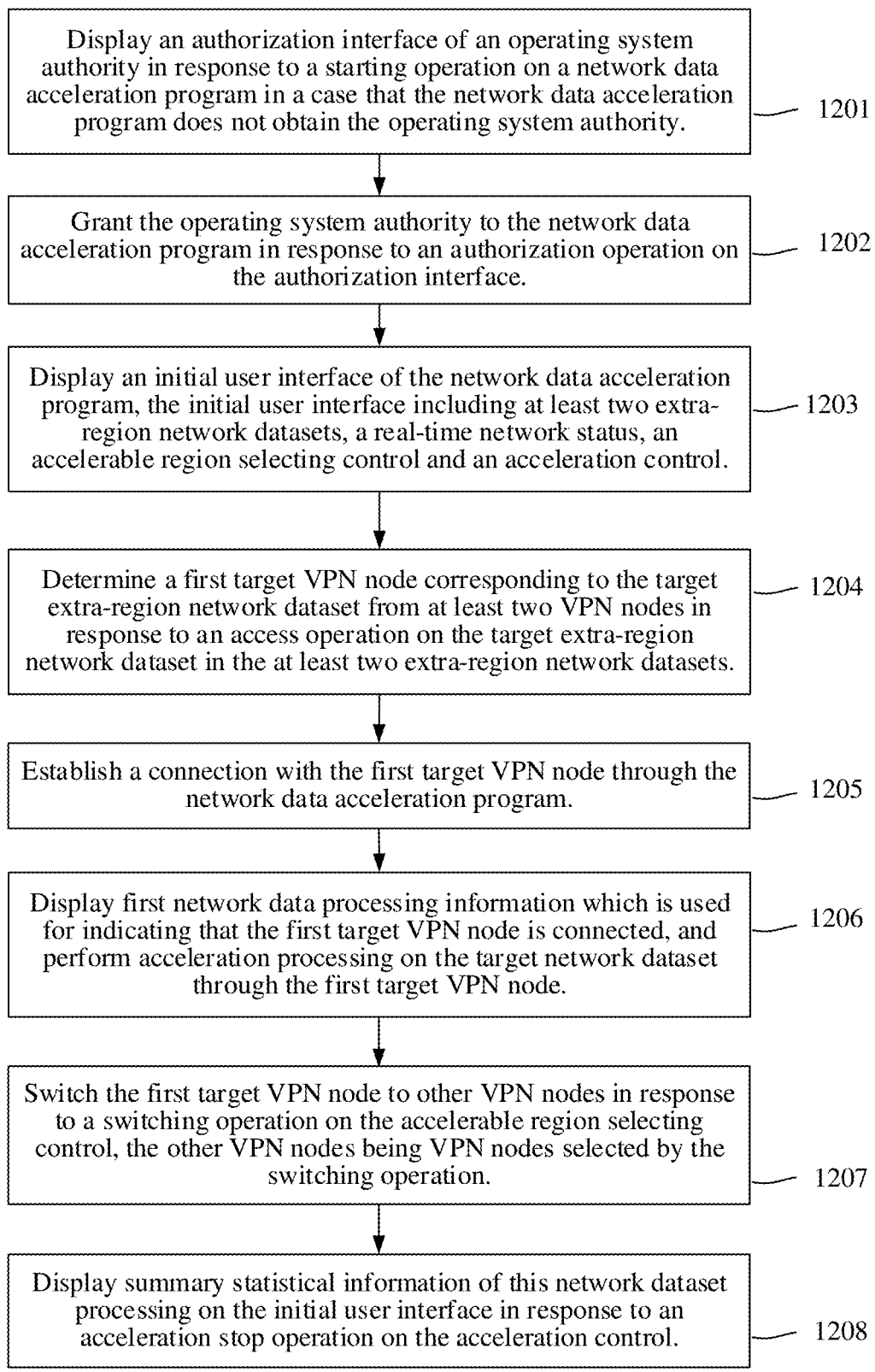
FIG. 12 is a flowchart of a network dataset processing method provided by another example of the present subject matter.

In an example, FIG. 12 is a flowchart of a network dataset processing method provided by an example of the present subject matter. The method includes:

Step 1201: Display an authorization interface of an operating system authority in response to a starting operation on the network data acceleration program in a case that the network data acceleration program does not obtain the operating system authority.

The operating system authority includes an operating system authority required by the network data acceleration program when running. The operating system authority may be an authority required by the network data acceleration program during running.

Step 1202: Grant the operating system authority to the network data acceleration program in response to an authorization operation on the authorization interface.

In response to an authorization operation on the authorization interface, an operating system grants the operating system authority to the network data acceleration program.

Optionally, the operating system authority includes at least one of a VPN authority, a storage authority, or an application survival authority.

Step 1203: Display an initial user interface of the network data acceleration program, the initial user interface including at least two extra-region network datasets, a real-time network status, an accelerable region selecting control and an acceleration control.

After obtaining the operating system authority, the terminal displays the initial user interface of the network data acceleration program. The initial user interface includes at least two extra-region network datasets, a real-time network status, an accelerable region selecting control and an acceleration control.

The extra-region network dataset includes at least one of the following types: video conference extra-region network datasets, teaching management resources, collaborative tool resources, teaching platform resources, academic journal paper resources, and information forum resources. Any one of video conference extra-region network datasets, teaching management resources, collaborative tool resources, teaching platform resources, academic journal paper resources, and information forum resources may be used as a target extra-region network dataset. The present subject matter does not limit the type of the target extra-region network dataset. It may be easy to understand that the extra-region network dataset in this example may be the above network dataset.

The real-time network status on the initial user interface includes an average delay of the current network, network stability and estimated speed increase.

The accelerable region selecting control on the initial user interface has multiple expression modes. Based on a touch operation of the user on the accelerable region selecting control, the terminal displays an unfolded status of the accelerable region selecting control.

Step 1204: Determine a first target VPN node corresponding to the target extra-region network dataset from at least two VPN nodes in response to an access operation on the target extra-region network dataset in the at least two extra-region network datasets.

Multiple extra-region network datasets for accessing may be displayed in an initial user interface of an extra-region network data acceleration program. In other words, icons of multiple extra-region network datasets for accessing may be displayed.

In response to an access operation of the user on the target extra-region network dataset, the extra-region network data acceleration program automatically determines a first target VPN node corresponding to the target network dataset from at least two VPN nodes.

Step 1205: Establish a connection with the first target VPN node through the network data acceleration program.

After determining the first target VPN node corresponding to the target extra-region network dataset, the extra-region network data acceleration program may be automatically connected to the first target VPN node, to form an accelerated connection for accessing the target extra-region network dataset.

Step 1206: Display first network data processing information which may be used for indicating that the first target VPN node may be connected, and perform acceleration processing on the target network dataset through the first target VPN node.

The first network data processing information includes at least one of the following information: a country where the first target VPN node may be located, a region where the first target VPN node may be located, a connected duration of the first target VPN node, an accelerated duration of the first target VPN node, an acceleration performance of the first target VPN node, a network speed value of the first target VPN node, a delay value of the first target VPN node, a network stability grade of the first target VPN node, a used traffic of the first target VPN node, a node name of the first target VPN node, and an IP address of the first target VPN node.

Step 1207: Switch the first target VPN node to other VPN nodes in response to a switching operation on the accelerable region selecting control, the other VPN nodes being VPN nodes selected by the switching operation.

After the network data acceleration program may be automatically connected to the first target VPN node, the user may manually modify the VPN node being connected.

Based on a touch operation of the user on the accelerable region selecting control, the terminal displays an unfolded status of the accelerable region selecting control. Options of multiple VPN nodes may be displayed on the accelerable region selecting control in an unfolded status. The user may select one of the VPN nodes or a VPN node in a country or a VPN node in a region and may slide up or down to display more options of VPN nodes, which will not be repeated here.

After the user selects a VPN node, the network data acceleration program switches the first target VPN node to other VPN nodes, disconnects the connection with the first target VPN node, and switches the connection to other VPN nodes.

Step 1208: Display summary statistical information of this network dataset processing on the initial user interface in response to an acceleration stop operation on the acceleration control.

After connecting to the first target VPN node or other VPN nodes, the acceleration control on the initial user interface may be displayed in an acceleration stoppable state. In response to an acceleration stop operation of the user on the acceleration control, the terminal displays summary statistical information of this network dataset processing on the initial user interface. Optionally, the acceleration stop operation may be an operation of tapping the acceleration control in an acceleration stoppable state.

In an example, in response to an acceleration stop operation of the user on the acceleration control, the terminal displays summary statistical information of this network dataset processing on the initial user interface. Exemplarily, the summary statistical information includes a first network data processing information region, a comparison region before and after acceleration, a question feedback control and a share to friends control.

In conclusion, by setting at least two extra-region network datasets in the network data acceleration program and setting a corresponding VPN node for each extra-region network dataset, when the user wants to access the target extra-region network dataset, a first target VPN node corresponding to the target extra-region network dataset may be determined from the at least two VPN nodes, so as to provide first network data processing information services corresponding to the target extra-region network dataset. The extra-region network data acceleration program meets network supervision requirements and may provide stable first network data processing information services for the target extra-region network dataset, so that the network stability when the user accesses the extra-region network dataset may be improved.

Figure 13:
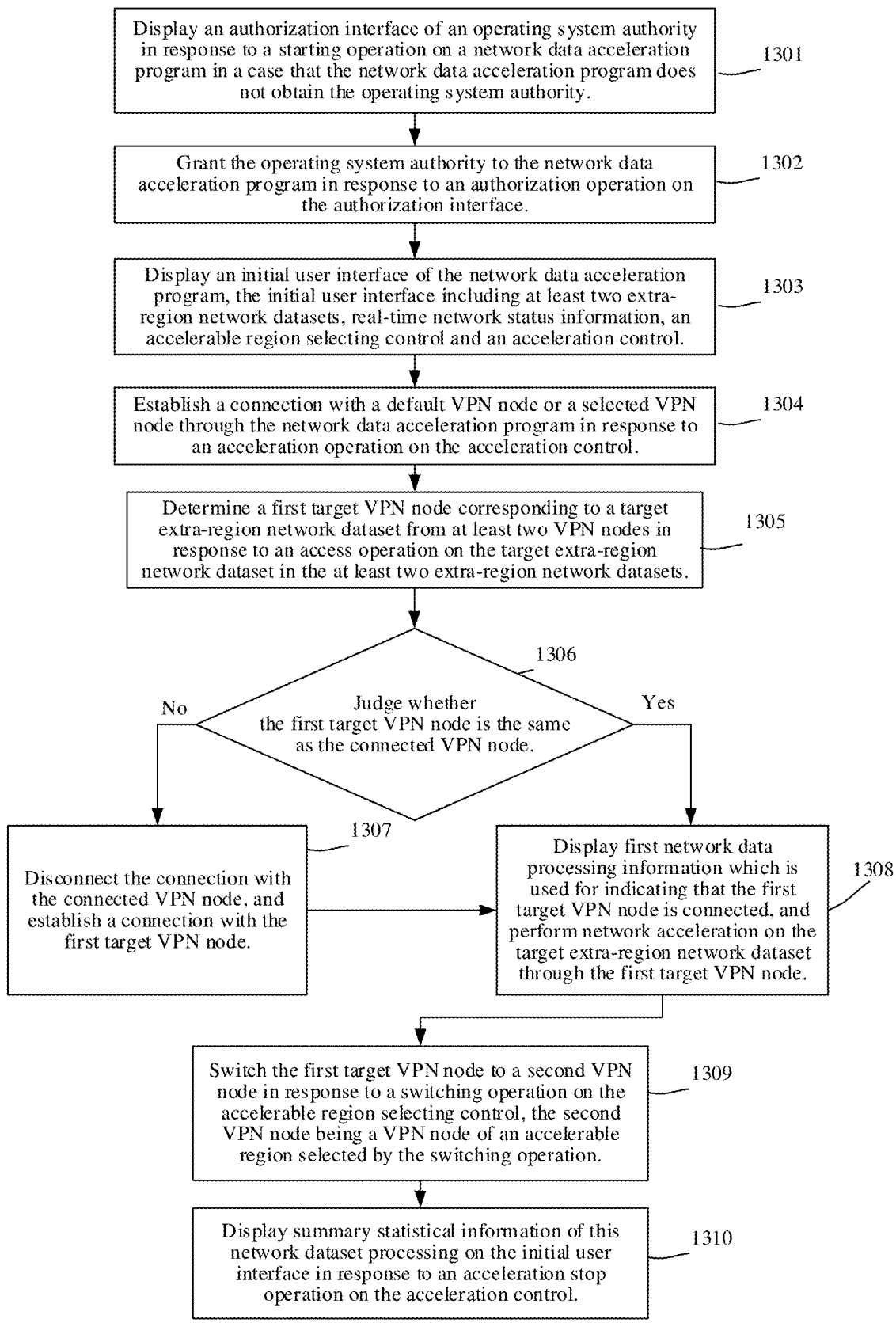
FIG. 13 is a flowchart of a network dataset processing method provided by another example of the present subject matter.

In an example, FIG. 13 is a flowchart of a network dataset processing method provided by an example of the present subject matter. The method includes:

Step 1301: Display an authorization interface of an operating system authority in response to a starting operation on the network data acceleration program in a case that the network data acceleration program does not obtain the operating system authority.

The operating system authority includes an operating system authority required by the network data acceleration program when running. The operating system authority may be an authority required by the network data acceleration program during running.

Step 1302: Grant the operating system authority to the network data acceleration program in response to an authorization operation on the authorization interface.

In response to an authorization operation on the authorization interface, an operating system grants the operating system authority to the network data acceleration program. Optionally, the operating system authority includes at least one of a VPN authority, a storage authority, or an application survival authority.

Step 1303: Display an initial user interface of the network data acceleration program, the initial user interface including at least two extra-region network datasets, real-time network status information, an accelerable region selecting control and an acceleration control.

After obtaining the operating system authority, the terminal displays the initial user interface of the network data acceleration program. The initial user interface includes at least two extra-region network datasets, real-time network status information, an accelerable region selecting control and an acceleration control.

Step 1304: Establish a connection with a default VPN node or a selected VPN node through the network data acceleration program in response to an acceleration operation on the acceleration control.

In response to an acceleration operation on the acceleration control, the system establishes a connection with an extra-region network dataset server through the default VPN node or the selected VPN node, where the extra-region network dataset server may be a server for providing extra-region network datasets. In response to an acceleration operation on the acceleration control, the terminal controls the initial user interface to display an extra-region network dataset server set that the currently selected VPN node may connect to, and the connectable extra-region network dataset server set includes at least two extra-region network datasets. It may be easy to understand that the extra-region network dataset in this example may be the above network dataset.

Step 1305: Determine a first target VPN node corresponding to the target extra-region network dataset from at least two VPN nodes in response to an access operation on the target extra-region network dataset in the at least two extra-region network datasets.

After determining the VPN node selected by the user, the terminal may display the extra-region network dataset set that the currently selected VPN node may connect to based on the initial user interface, and the user may select a target extra-region network dataset in the set to access the target extra-region network dataset.

When the extra-region network dataset set may be displayed, the terminal may determine a first target VPN node corresponding to the target extra-region network dataset in response to an access operation on the target extra-region network dataset in the extra-region network dataset set.

Optionally, the access operation may be at least one of a tap operation, a double-tap operation, a pressure touch operation, a suspended touch operation, or a slide operation on the target extra-region network dataset.

Step 1306: Judge whether the first target VPN node is the same as the connected VPN node;

perform step 1307 if the first target VPN node is different from the connected VPN node; and perform step 1308 if the first target VPN node may be the same as the connected VPN node.

In response to an access operation of the user on the target extra-region network dataset, the initial user interface displays the first target VPN node. If the first target VPN node may be different from the connected VPN node, the connection with the connected VPN node may be disconnected, and a connection with the first target VPN node may be established. If the first target VPN node is the same as the connected VPN node, first network data processing information may be displayed.

Step 1307: Disconnect the connection with the connected VPN node, and establish a connection with the first target VPN node.

Since the first target VPN node may be different from the connected VPN node, the terminal disconnects the connection with the connected VPN node, and establishes a connection with the first target VPN node.

Step 1308: Display first network data processing information which may be used for indicating that the first target VPN node may be connected, and perform network acceleration on the target extra-region network dataset through the first target VPN node.

The first network data processing information includes at least one of the following information: a country where the first target VPN node may be located, a region where the first target VPN node may be located, a connected duration of the first target VPN node, an accelerated duration of the first target VPN node, an acceleration performance of the first target VPN node, a network speed value of the first target VPN node, a delay value of the first target VPN node, a network stability grade of the first target VPN node, a used traffic of the first target VPN node, a node name of the first target VPN node, and an IP address of the first target VPN node.

Step 1309: Switch the first target VPN node to a second VPN node in response to a switching operation on the accelerable region selecting control, the second VPN node being a VPN node of an accelerable region selected by the switching operation.

In response to a selecting operation of the user on the accelerable region selecting control, the terminal may determine the accelerable region selected by the selecting operation, and determine a second VPN node corresponding to the selected accelerable region. In an example, the terminal may further display an unfolded status of the accelerable region selecting control. Options of multiple accelerable regions (VPN nodes) may be displayed on the accelerable region selecting control in an unfolded status. The user may select one of the accelerable regions (a VPN node or a VPN node in a country or a VPN node in a region) and may slide up or down to display more accelerable regions, which will not be repeated here.

After determining a second VPN node corresponding to the selected accelerable region, the network data acceleration program switches the first target VPN node to the second VPN node, disconnects the connection with the first target VPN node, and switches the connection to the second VPN node.

Since a network acceleration channel may be established based on the first target VPN node or the second VPN node, the diversity of VPN nodes for establishing the network acceleration channel may be improved. Since the first target VPN node may be switched to the second VPN node, the deficiencies of the first target VPN node may be compensated by the second VPN node, thereby increasing the access rate of the target network dataset, and saving the power resources consumed due to a low access rate.

Step 1310: Display summary statistical information of this network dataset processing on the initial user interface in response to an acceleration stop operation on the acceleration control.

After connecting to the first target VPN node or other VPN nodes, the acceleration control on the initial user interface may be displayed in an acceleration stoppable state. In response to an acceleration stop operation of the user on the acceleration control, the terminal displays summary statistical information of this network dataset processing on the initial user interface. Optionally, the acceleration stop operation may be an operation of tapping the acceleration control in an acceleration stoppable state.

In an example, in response to an acceleration stop operation of the user on the acceleration control, the terminal displays summary statistical information of this network dataset processing on the initial user interface. The summary statistical information includes a first network data processing information region, a comparison region before and after acceleration, a question feedback control and a share to friends control.

In conclusion, by setting at least two extra-region network datasets in the extra-region network data acceleration program and setting a corresponding VPN node for each extra-region network dataset, when the user wants to access the target extra-region network dataset, a first target VPN node corresponding to the target extra-region network dataset may be determined from the at least two VPN nodes, so as to increase the access rate of the target extra-region network dataset. The network data acceleration program meets network supervision requirements and may stably increase the access rate of the target extra-region network dataset, so that the network stability when the user accesses the extra-region network dataset may be improved.

Figure 14:
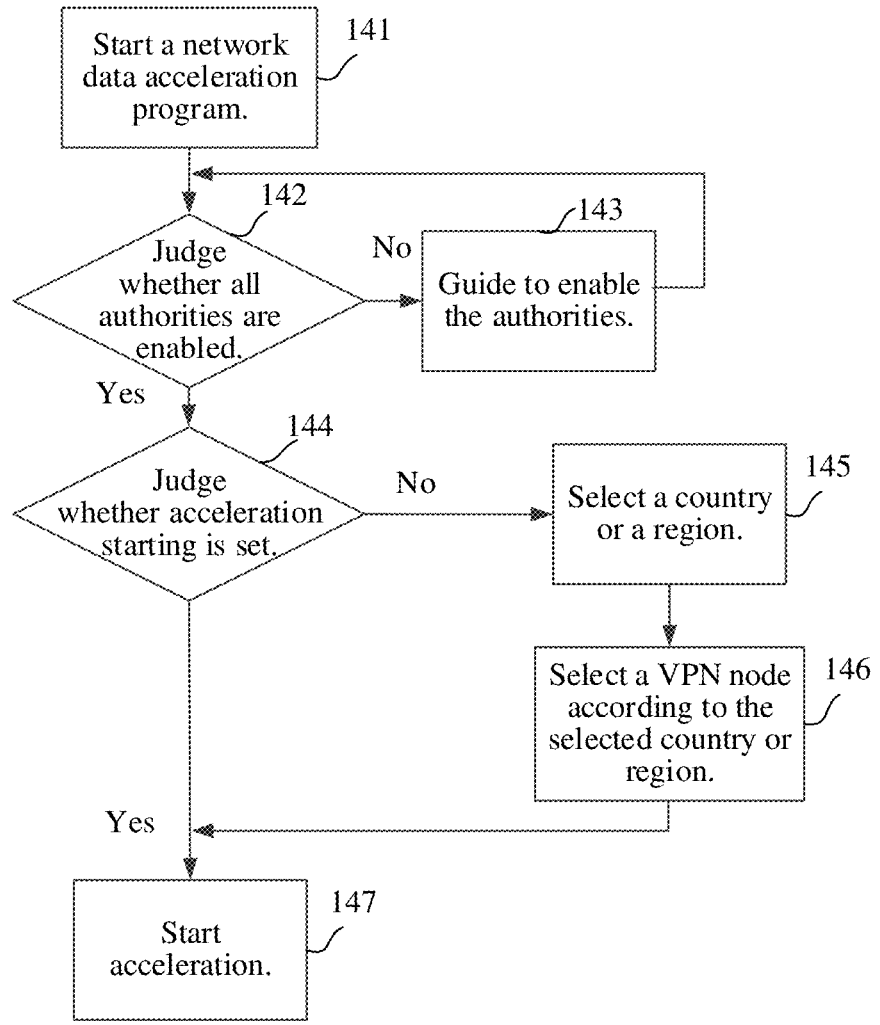
FIG. 14 is a flowchart of starting of a network data acceleration program provided by an example of the present subject matter.

In an example, FIG. 14 is a flowchart of starting of a network data acceleration program provided by an example of the present subject matter, and a starting process of the network data acceleration program is shown in FIG. 14.

Step 141: Start the network data acceleration program.

In response to a user operation of starting the network data acceleration program, a display screen of the terminal enters the home page of the network data acceleration program.

Step 142: Judge whether all authorities may be enabled.

The network data acceleration program checks whether the following operating system authority statuses may be enabled in sequence: a VPN authority, a storage authority, or an application survival authority.

If the authorities may be enabled, step 144 may be performed; and if the authorities may not be enabled, step 143 may be performed.

Step 143: Guide to enable the authorities.

The network data acceleration program guides the user to enable the above operating system authorities. For example, the network data acceleration program displays an authorization interface, so that the user may enable the above operating system authorities for the network data acceleration program on the authorization interface.

If one or more authorities may not be enabled, the user may be guided to enable the authorities one by one.

Step 144: Judge whether acceleration starting may be set.

The network data acceleration program judges whether a VPN node may be connected;

if yes, step 147 may be performed; and if no, step 145 may be performed.

Step 145: Select, by the user, a country, or a region.

Step 146: Select a VPN node according to the selected country or region.

Step 147: Start acceleration.

Based on the above steps, the network data acceleration program starts acceleration.

In conclusion, by enabling the VPN authorities before the acceleration starting by the terminal, setting the acceleration starting and finally implementing the acceleration starting of the network data acceleration program, the network data acceleration program meets network supervision requirements and may provide stable network acceleration services for the target network dataset, so that the network stability when the user accesses a foreign network dataset may be improved.

Figure 15:
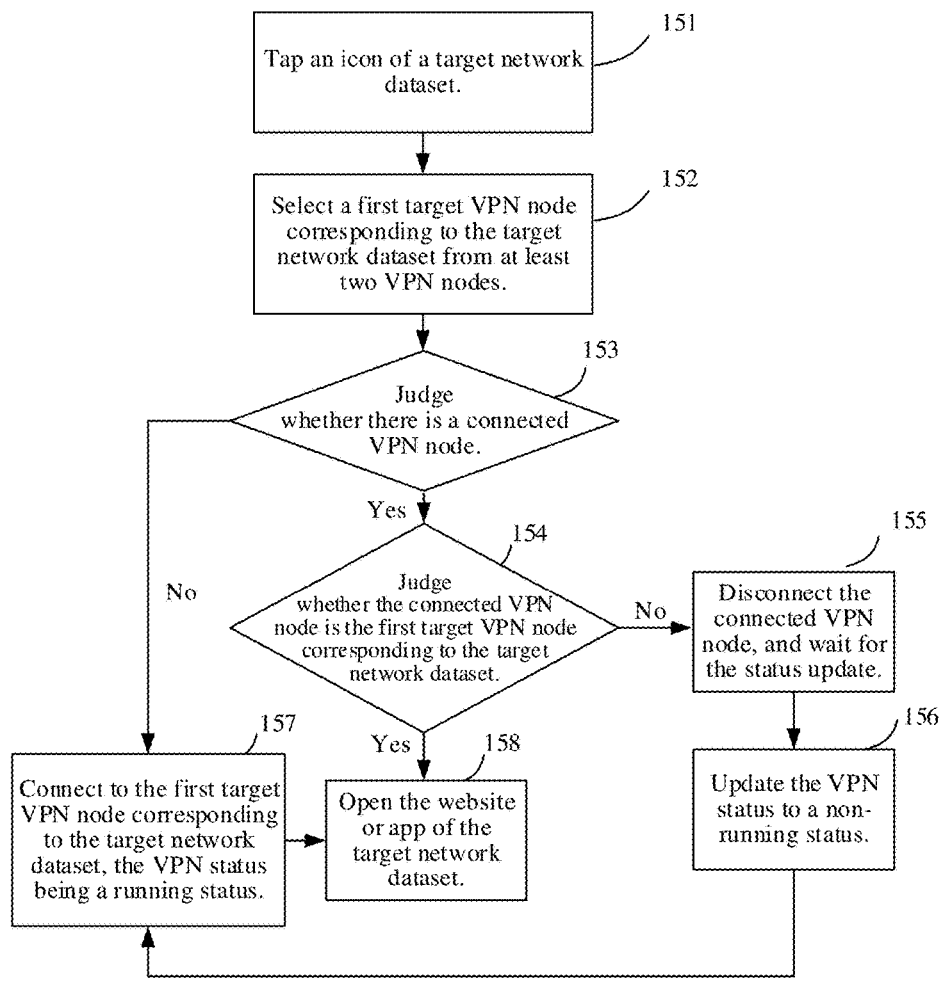
FIG. 15 is a flowchart of accelerated running of a network data acceleration program provided by an example of the present subject matter.

In an example, FIG. 15 is a flowchart of accelerated running of a network data acceleration program provided by an example of the present subject matter, and an accelerated running process of the network data acceleration program is shown in FIG. 15.

Step 151: Tap an icon of a target network dataset.

Step 152: Select a first target VPN node corresponding to the target network dataset from at least two VPN nodes.

Step 153: Judge whether there may be a connected VPN node;

if yes, perform step 154; and if no, perform step 157.

Step 154: Judge whether the connected VPN node may be the first target VPN node corresponding to the target network dataset;

if no, perform step 155; and if yes, perform step 158.

Step 155: Disconnect the connected VPN node, and wait for the status update.

Step 156: Update the VPN status to a non-running status.

Step 157: Connect to the first target VPN node corresponding to the target network dataset, the VPN status being a running status.

Step 158: Open the website or app of the target network dataset.

Figure 16:
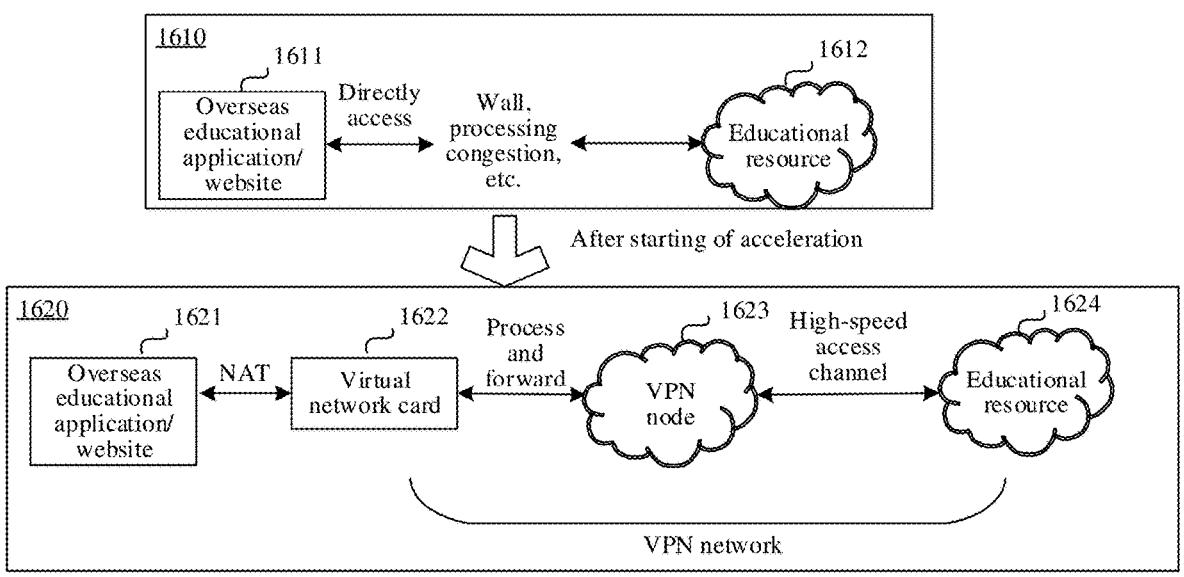
FIG. 16 is a schematic diagram of comparison before and after starting of a network data acceleration program provided by an example of the present subject matter.

FIG. 16 is a schematic diagram of comparison before and after starting of a network data acceleration program provided by an example of the present subject matter. Exemplarily, a network dataset may be an educational resource. FIG. 16 includes a region 1610 before starting of the network data acceleration program and a region 1620 after starting of the network data acceleration program. The region 1610 before starting of the network data acceleration program includes an overseas educational application/website 1611 and an educational resource 1612. The region 1620 after starting of the network data acceleration program includes an overseas educational application/website 1621, a virtual network card 1622, a VPN node 1623 and an educational resource 1624.

Before starting of the network data acceleration program, the user may directly access the overseas educational application/website 1611 to obtain the educational resource 1612. To obtain the educational resource of the overseas educational application/website, the user needs to go through complex networks. Due to the congestion of data processing in the complex networks, the user may not obtain the educational resource in time.

After starting of the network data acceleration program, the network data acceleration program establishes the virtual network card 1622. The terminal forwards the data packet of the overseas educational application/website 1621 to its own internal virtual network card 1622 through network address translation (NAT), and the virtual network card processes the data packet. A VPN acceleration network may be established among the virtual network card 1622, the VPN node 1623 and the educational resource 1624.

In conclusion, by ensuring that the VPN provides services for the APP/website that needs to be accelerated through the terminal, the network data acceleration program meets network supervision requirements and may provide stable network acceleration services for the target network dataset, so that the network stability when the user accesses a foreign network dataset may be improved.

Figure 17:
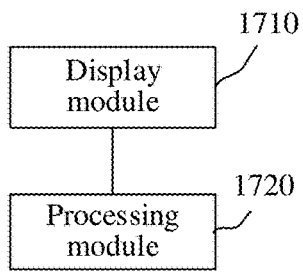
FIG. 17 is a structural block diagram of a network dataset processing apparatus provided by an example of the present subject matter.

FIG. 17 is a structural block diagram of a network acceleration apparatus of an extra-region network resource provided by an example of the present subject matter. As shown in FIG. 17, the apparatus includes:

a display module 1710 configured to generate an initial user interface in a terminal, the initial user interface being configured to access at least one network dataset; and a processing module 1720 configured to use a network dataset selected from the at least one network dataset as a target network dataset in response to a selecting operation on the at least one network dataset; and determine a first target VPN node corresponding to the target network dataset in response to an access operation on the target network dataset, and establish a first accelerated access channel between the terminal and the target network dataset through the first target VPN node.

The processing module 1720 may be further configured to switch the initial user interface to a first accelerated user interface of the target network dataset, first network data processing information may be displayed on the first accelerated user interface, and the first network data processing information may be used for indicating that the first accelerated access channel may be being used for accessing the target network dataset.

In an example, the processing module 1720 may be further configured to monitor a data transmission speed at which the terminal accesses the at least one network dataset; determine a second target VPN node in response to a monitoring result of the data transmission speed, and establish a second accelerated access channel between the terminal and the at least one network dataset through the second target VPN node; and switch the initial user interface to a second accelerated user interface, second network data processing information being displayed on the second accelerated user interface, and the second network data processing information being used for indicating that the second accelerated access channel may be being used for accessing the at least one network dataset.

In an example, the processing module 1720 may be further configured to determine a second target VPN node in response to a monitoring result of the data transmission speed, where the monitoring result includes one or more of the following conditions: the data transmission speed may be lower than a preset data propagation speed threshold; a duration of the data transmission speed being lower than a preset data propagation speed threshold exceeds a preset time length; and the data transmission speed varies with time, and a variation range of the data transmission speed within a preset time length exceeds a preset value.

In an example, the processing module 1720 may be further configured to respond to a monitoring result of the data transmission speed, where the data transmission speed includes a data download speed of the at least one network dataset downloaded to the terminal, or a data upload speed of the at least one network dataset uploaded from the terminal, or both the data download speed and the data upload speed.

In an example, the processing module 1720 may be further configured to determine at least two VPN nodes in response to an access operation on the target network dataset; and select a first target VPN node corresponding to the target network dataset from the at least two VPN nodes.

In an example, the processing module 1720 may be further configured to determine a geographic position of a target extra-region network resource; determine a distance between each of the at least two VPN nodes and the geographic position respectively; and use a VPN node with the minimum distance as a first target VPN node.

In an example, the processing module 1720 may be further configured to determine a network delay between each of the at least two VPN nodes and the target extra-region network resource respectively; and use a VPN node with the minimum network delay as a first target VPN node.

In an example, the processing module 1720 may be further configured to determine a network acceleration performance between each of the at least two VPN nodes and the target extra-region network resource respectively; and use a VPN node with the best network acceleration performance as a first target VPN node.

In an example, the processing module 1720 may be further configured to determine a first VPN node corresponding to a selected accelerable region in response to a selecting operation on the accelerable region selecting control.

In an example, the processing module 1720 may be further configured to establish a first accelerated access channel through the first VPN node in response to a trigger operation on the acceleration starting control.

In an example, the processing module 1720 may be further configured to disconnect the first accelerated access channel with the first VPN node, and establish a first accelerated access channel with the first target VPN node in a case that the first VPN node may be different from the first target VPN node.

In an example, the processing module 1720 may be further configured to display the first network data processing information on the initial user interface.

In an example, the processing module 1720 may be further configured to display the first network data processing information in a status bar in response to a viewing operation on the status bar.

In an example, the processing module 1720 may be further configured to display the first network data processing information in a system notification message in response to a viewing operation on the notification message.

In an example, an accelerable region selecting control may be further displayed on the initial user interface, the processing module 1720 may be further configured to switch the first target VPN node to a second VPN node in response to a selecting operation on the accelerable region selecting control, and the second VPN node may be a VPN node corresponding to an acceleration region selected by the selecting operation.

In an example, the processing module 1720 may be further configured to display real-time network status information on the initial user interface.

In an example, the processing module 1720 may be further configured to display summary statistical information of this network dataset processing on the initial user interface in response to an acceleration stop operation.

In an example, the processing module 1720 may be further configured to determine whether the network data acceleration processing function obtains an operating system authority in response to a starting operation on a network data acceleration processing function; display an authorization interface of the operating system authority in a case that the network data acceleration processing function does not obtain the operating system authority; and grant the operating system authority to the network data acceleration processing function in response to an authorization operation on the authorization interface.

In an example, the processing module 1720 may be further configured to grant the operating system authority to the network data acceleration processing function in response to an authorization operation on the authorization interface. The operating system authority includes: at least one of a VPN authority, a storage authority, or an application survival authority.

In conclusion, according to the apparatus provided by this example, by setting at least two network datasets in the network data acceleration program and setting a corresponding VPN node for each network dataset, when the user wants to access the target network dataset, the initial user interface may be switched to the first accelerated user interface of the target network dataset, so as to increase the access rate of the target network dataset, and save the power resources wasted due to a low access rate. The network data acceleration program meets network supervision requirements, provides stable network acceleration services for the target network dataset, and may facilitate the user to directly connect the target network dataset to directly access the target network dataset, so that the network stability and access efficiency when the user accesses the network dataset may be improved, and the use experience of the user may be greatly improved.

The term module (and other similar terms such as unit, subunit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory) Likewise, a processor (or processors and memory) can be used to implement one or more modules. Moreover, each module can be part of an overall module that includes the functionalities of the module.

Figure 18:
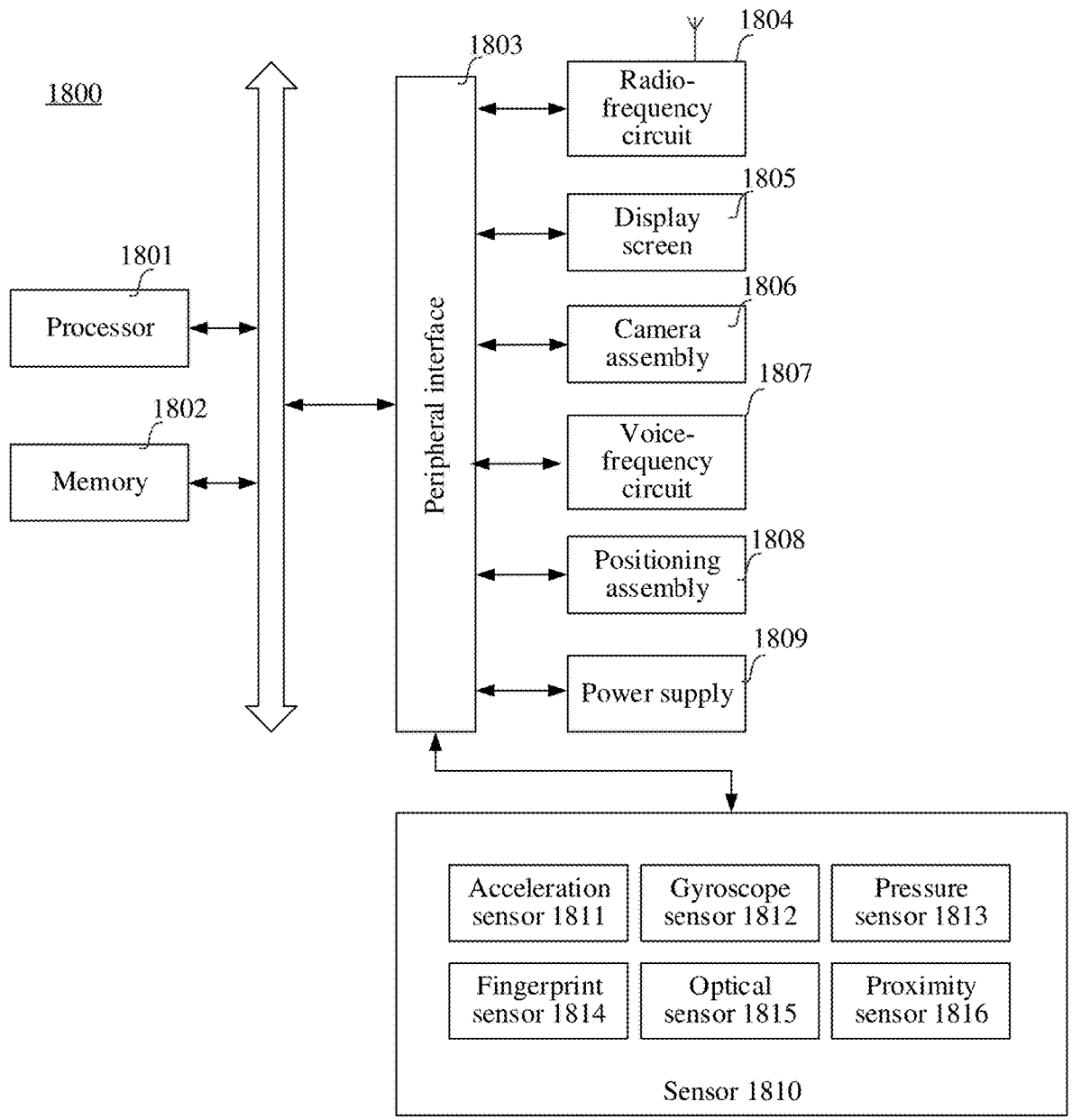
FIG. 18 is a schematic structural diagram of a computer device according to an example.

FIG. 18 shows a structural block diagram of an electronic device 1800 provided by an example of the present subject matter. The electronic device 1800 may be a portable mobile terminal, such as: a smartphone, a tablet computer, a moving picture experts group audio layer III (MP3) player, a moving picture experts group audio layer IV (MP4) player, a notebook computer, or a desktop computer. The electronic device 1800 may further be referred to as another name such as user equipment, a portable terminal, a laptop terminal, or a desktop terminal.

Generally, the electronic device 1800 includes: a processor 1801 and a memory 1802.

The processor 1801 may include one or more processing cores, such as, a 4-core processor or an 8-core processor. The processor 1801 may be implemented by using at least one hardware form of a digital signal processor (DSP), a field-programmable gate array (FPGA), and a programmable logic array (PLA). The processor 1801 may further include a main processor and a coprocessor. The main processor may be a processor configured to process data in an active state, also referred to as a central processing unit (CPU). The coprocessor may be a low-power processor configured to process data in a standby state. In some examples, the processor 1801 may be integrated with a graphics processing unit (GPU). The GPU may be configured to render and draw content that needs to be displayed on a display. In some examples, the processor 1801 may further include an artificial intelligence (AI) processor. The AI processor may be configured to process a computing operation related to machine learning.

The memory 1802 may include one or more computer-readable storage media that may be non-transitory. The memory 1802 may further include a high-speed random access memory (RAM), and a non-volatile memory such as one or more magnetic disk storage devices or flash storage devices. In some examples, the non-transitory computer-readable storage medium in the memory 1802 may be configured to store at least one instruction, and the at least one instruction may be configured to be executed by the processor 1801 to implement the acceleration method of an extra-region network resource provided in the method examples of the present subject matter.

In some examples, the electronic device 1800 may optionally include: a peripheral interface 1803 and at least one peripheral device. The processor 1801, the memory 1802, and the peripheral interface 1803 may be connected through a bus or a signal cable. Each peripheral device may be connected to the peripheral interface 1803 through a bus, a signal cable, or a circuit board. Specifically, the peripheral device includes: at least one of a radio-frequency circuit 1804, a display screen 1805, a camera assembly 1806, a voice-frequency circuit 1807, a positioning assembly 1808, and a power supply 1809.

The peripheral interface 1803 may be configured to connect at least one peripheral device related to input/output (I/O) to the processor 1801 and the memory 1802. In some examples, the processor 1801, the memory 1802, and the peripheral interface 1803 may be integrated on the same chip or the same circuit board. In some other examples, any or both of the processor 1801, the memory 1802, and the peripheral interface 1803 may be implemented on an independent chip or a circuit board. This may not be limited in this example.

The radio-frequency circuit 1804 may be configured to receive and transmit an RF signal, which may be also referred to as an electromagnetic signal. The radio-frequency circuit 1804 communicates with a communication network and other communication devices through the electromagnetic signal. The radio-frequency circuit 1804 converts an electrical signal into an electromagnetic signal for transmission, or converts a received electromagnetic signal into an electrical signal. Optionally, the radio-frequency circuit 1804 includes: an antenna system, an RF transceiver, one or more amplifiers, a tuner, an oscillator, a digital signal processor, a codec chip set, a user identity module card, and the like. The radio-frequency circuit 1804 may communicate with another terminal by using at least one wireless communication protocol. The wireless communication protocol includes but may not be limited to: a world wide web, a metropolitan area network, an intranet, generations of mobile communication networks (2G, 3G, 4G, and 5G), a wireless local area network, and/or a wireless fidelity (Wi-Fi) network. In some examples, the radio-frequency 1804 may further include a circuit related to a near field communication (NFC), which may not be limited in the present subject matter.

The display screen 1805 may be configured to display a user interface (UI). The UI may include a graphic, text, an icon, a video, and any combination thereof. When the display screen 1805 may be a touch display screen, the display screen 1805 also has a capability to collect a touch signal on or above a surface of the display screen 1805. The touch signal may be input, as a control signal, to the processor 1801 for processing. In this case, the display screen 1805 may be further configured to provide a virtual button and/or a virtual keyboard, which may be also referred to as a soft button and/or a soft keyboard. In some examples, there may be one display screen 1805, disposed on a front panel of the electronic device 1800. In some other examples, there may be at least two display screens 1805, disposed on different surfaces of the electronic device 1800 respectively or in a folded design. In still other examples, the display screen 1805 may be a flexible display screen, disposed on a curved surface or a folded surface of the electronic device 1800. Even, the display screen 1805 may be further set in a non-rectangular irregular graph, that is, a special-shaped screen. The display screen 1805 may be prepared by using materials such as a liquid crystal display (LCD), an organic light-emitting diode (OLED), or the like.

The camera component 1806 may be configured to collect an image or a video. Optionally, the camera component 1806 includes a front-facing camera and a rear-facing camera. Generally, the front-facing camera may be disposed on a front panel of the terminal, and the rear-facing camera may be disposed on a rear surface of the terminal In some examples, there may be at least two rear cameras, which may be respectively any of a main camera, a depth-of-field camera, a wide-angle camera, and a telephoto camera, to achieve background blur through fusion of the main camera and the depth-of-field camera, and achieve panoramic photographing and virtual reality (VR) photographing through fusion of the main camera and the wide-angle camera, or other fusion photographing functions. In some examples, the camera assembly 1806 may further include a flashlight. The flash may be a single color temperature flash, or may be a double color temperature flash. The double color temperature flash refers to a combination of a warm light flash and a cold light flash, and may be used for light compensation under different color temperatures.

The voice-frequency circuit 1807 may include a microphone and a speaker. The microphone may be configured to collect sound waves of a user and an environment, and convert the sound waves into an electrical signal and input to the processor 1801 for processing, or input to the radio-frequency circuit 1804 to implement voice communication. For stereo sound collection or noise reduction, there may be a plurality of microphones, respectively disposed at different parts of the electronic device 1800. The microphone may further be an array microphone or an omni-directional collection type microphone. The speaker may be configured to convert the electrical signal from the processor 1801 or the radio-frequency circuit 1804 into sound waves. The speaker may be a conventional thin-film speaker or a piezo-electric ceramic speaker. When the speaker may be the piezoelectric ceramic speaker, the electrical signal not only may be converted into sound waves that may be heard by human, but also may be converted into sound waves that may not be heard by human for ranging and the like. In some examples, the voice-frequency circuit 1807 may further include a headphone jack.

The positioning component 1808 may be configured to position a current geographic location of the electronic device 1800, to implement a navigation or a location-based service (LBS). The positioning component 1808 may be a positioning component based on a global positioning system (GPS) of the United States, a BeiDou System of China, and a GALILEO System of Russia.

The power supply 1809 may be configured to supply power to components in the electronic device 1800. The power supply 1809 may be an alternating current, a direct current, a disposable battery, or a rechargeable battery. In a case that the power supply 1809 includes the rechargeable battery, the rechargeable battery may be a wired charging battery or a wireless charging battery. The wired charging battery may be a battery charged through a wired line, and the wireless charging battery may be a battery charged through a wireless coil. The rechargeable battery may be further configured to support a quick charge technology.

In some examples, the electronic device 1800 further includes one or more sensors 1810. The one or more sensors 1810 include but may not be limited to an acceleration sensor 1811, a gyroscope sensor 1812, a pressure sensor 1813, a fingerprint sensor 1814, an optical sensor 1815, and a proximity sensor 1816.

The acceleration sensor 1811 may detect a magnitude of acceleration on three coordinate axes of a coordinate system established by the electronic device 1800. For example, the acceleration sensor 1811 may be configured to detect components of gravity acceleration on the three coordinate axes. The processor 1801 may control, according to a gravity acceleration signal collected by the acceleration sensor 1811, the display screen 1805 to display the UI in a frame view or a portrait view. The acceleration sensor 1811 may be further configured to collect motion data of a game or a user.

The gyroscope sensor 1812 may detect a body direction and a rotation angle of the electronic device 1800. The gyroscope sensor 1812 may cooperate with the acceleration sensor 1811 to collect a 3D action by the user on the electronic device 1800. The processor 1801 may implement the following functions according to the data collected by the gyroscope sensor 1812: motion sensing (such as, change of the UI based on a tilt operation of the user), image stabilization during photographing, game control, and inertial navigation.

The pressure sensor 1813 may be disposed on a side frame of the electronic device 1800 and/or a lower layer of the display screen 1805. In a case that the pressure sensor 1813 may be disposed at the side frame of the electronic device 1800, a holding signal of the user on the electronic device 1800 may be detected, and left/right hand identification or a quick action may be performed by the processor 1801 according to the holding signal collected by the pressure sensor 1813. When the pressure sensor 1813 may be disposed on the low layer of the display screen 1805, the processor 1801 controls, according to a pressure operation of the user on the display screen 1805, an operable control on the UI interface. The operable control includes at least one of a button control, a scroll-bar control, an icon control, or a menu control.

The fingerprint sensor 1814 may be configured to collect a fingerprint of a user, and the processor 1801 recognizes an identity of the user according to the fingerprint collected by the fingerprint sensor 1814, or the fingerprint sensor 1814 recognizes the identity of the user based on the collected fingerprint. When identifying that the user's identity may be a trusted identity, the processor 1801 authorizes the user to perform related sensitive operations. The sensitive operations include: unlocking a screen, viewing encrypted information, downloading software, paying, changing a setting, and the like. The fingerprint sensor 1814 may be disposed on a front face, a back face, or a side face of the electronic device 1800. In a case that a physical button or a vendor logo may be disposed on the electronic device 1800, the fingerprint sensor 1814 may be integrated together with the physical button or the vendor logo.

The optical sensor 1815 may be configured to collect ambient light intensity. In an example, the processor 1801 may control display luminance of the display screen 1805 according to the ambient light intensity collected by the optical sensor 1815. Specifically, in a case that the ambient light intensity may be relatively high, the display luminance of the display screen 1805 may be increased; and in a case that the ambient light intensity may be relatively low, the display luminance of the display screen 1805 may be reduced. In another example, the processor 1801 may further dynamically adjust a photographing parameter of the camera component 1806 according to the ambient light intensity collected by the optical sensor 1815.

The proximity sensor 1816, also referred to as a distance sensor, may be usually disposed on the front panel of the electronic device 1800. The proximity sensor 1816 may be configured to collect a distance between the user and the front face of the electronic device 1800. In an example, when the proximity sensor 1816 detects that the distance between the user and the front surface of the electronic device 1800 gradually becomes small, the display screen 1805 may be controlled by the processor 1801 to switch from a screen-on state to a screen-off state. In an example, when the proximity sensor 1816 detects that the distance between the user and the front surface of the electronic device 1800 gradually increases, the display screen 1805 may be controlled by the processor 1801 to switch from the screen-off state to the screen-on state.

A person skilled in the art may understand that a structure shown in FIG. 18 constitutes no limitation on the electronic device 1800, and the electronic device may include more or fewer components than those shown in the figure, or some components may be combined, or a different component deployment may be used.

The present subject matter further provides a non-transitory computer-readable storage medium, the storage medium storing at least one instruction, at least one program, a code set or an instruction set, and the at least one instruction, the at least one program, the code set or the instruction set being loaded and executed by a processor to implement the network acceleration method of an extra-region network resource provided in the foregoing method examples.

The present subject matter provides a computer program product or a computer program. The computer program product or the computer program includes computer instructions, and the computer instructions may be stored in a non-transitory computer-readable storage medium. A processor of a computer device reads the computer instructions from the non-transitory computer-readable storage medium, and executes the computer instructions, causing the computer device to perform the network acceleration method of an extra-region network resource provided in the foregoing method examples.

The sequence numbers of the foregoing examples of the present subject matter may be merely for description and do not imply the preference of the examples.

A person of ordinary skill in the art may understand that all or some of the steps of the foregoing examples may be implemented by hardware, or may be implemented a program instructing related hardware. The program may be stored in a non-transitory computer-readable storage medium. The storage medium may be: a read-only memory, a magnetic disk, an optical disc, or the like.

The foregoing descriptions may be merely optional examples of the present subject matter, but may not be intended to limit the present subject matter. Any modification, equivalent replacement, or improvement made within the spirit and principle of the present subject matter shall fall within the protection scope of the present subject matter.

What is claimed is:

1. A network dataset processing method performed by a terminal, comprising:
    generating an initial user interface in the terminal, wherein the initial user interface is configured to access at least one network dataset;
    using a network dataset selected from the at least one network dataset as a target network dataset in response to a selecting operation on the at least one network dataset, wherein the target network dataset comprises an application that is selected to be accessed in response to the selecting operation;
    determining a first target virtual private network (VPN) node corresponding to the target network dataset in response to an access operation on the target network dataset;
    establishing a first accelerated access channel between the terminal and the target network dataset through the first target VPN node, the first accelerated access channel having a highest access rate among a plurality of connection channels;
    switching the initial user interface to a first accelerated user interface of the application when the application is selected in response to the selecting operation, wherein first network data processing information is displayed on the first accelerated user interface, and
    the first network data processing information indicates that the first accelerated access channel is used for accessing the target network dataset;
    determining whether a network data acceleration processing function obtains an operating system authority in response to a starting operation on the network data acceleration processing function;
    displaying an authorization interface of the operating system authority in a case that the network data acceleration processing function does not obtain the operating system authority; and
    granting the operating system authority to the network data acceleration processing function in response to an authorization operation on the authorization interface.

2. The method according to claim 1, further comprising:
    monitoring a data transmission speed at which the terminal accesses the at least one network dataset;
    determining a second target VPN node in response to a monitoring result of the data transmission speed;
    establishing a second accelerated access channel between the terminal and the at least one network dataset through the second target VPN node; and
    switching the initial user interface to a second accelerated user interface, wherein
    second network data processing information is displayed on the second accelerated user interface, and
    the second network data processing information indicates that the second accelerated access channel is used for accessing the at least one network dataset.

3. The method according to claim 2, wherein
the monitoring result comprises one or more of:
the data transmission speed is lower than a preset data propagation speed threshold;
a duration of the data transmission speed is lower than a preset data propagation speed threshold exceeds a preset time length; or
the data transmission speed varies with time, and a variation range of the data transmission speed within a preset time length exceeds a preset value.

4. The method according to claim 2, wherein the data transmission speed comprises:
a data download speed of the at least one network dataset downloaded to the terminal, or
a data upload speed of the at least one network dataset uploaded from the terminal, or
both the data download speed and the data upload speed.

5. The method according to claim 1, wherein the determining a first target VPN node corresponding to the target network dataset in response to an access operation on the target network dataset comprises:
determining at least two VPN nodes in response to an access operation on the target network dataset; and
selecting a first target VPN node corresponding to the target network dataset from the at least two VPN nodes.

6. The method according to claim 5, wherein the selecting a first target VPN node corresponding to the target network dataset from the at least two VPN nodes comprises:
determining a geographic position of the target network dataset;
determining a distance between each of the at least two VPN nodes and the geographic position respectively; and
using a VPN node with a minimum distance as a first target VPN node.

7. The method according to claim 5, wherein the selecting a first target VPN node corresponding to the target network dataset from the at least two VPN nodes comprises:
determining a network delay between each of the at least two VPN nodes and the target network dataset respectively; and
using a VPN node with a minimum network delay as a first target VPN node.

8. The method according to claim 5, wherein the selecting a first target VPN node corresponding to the target network dataset from the at least two VPN nodes comprises:
determining a network acceleration performance between each of the at least two VPN nodes and the target network dataset respectively; and
using a VPN node with the best network acceleration performance as a first target VPN node.

9. The method according to claim 5, wherein
an accelerable region selecting control and an acceleration starting control are further displayed on the initial user interface, and
the method further comprises:
determining a first VPN node corresponding to a selected accelerable region in response to a selecting operation on the accelerable region selecting control;
establishing an accelerated access channel through the first VPN node in response to a trigger operation on the acceleration starting control; and
after selecting a first target VPN node corresponding to the target network dataset from the at least two VPN nodes, the method further comprises:
disconnecting the accelerated access channel with the first VPN node, and
establishing an accelerated access channel with the first target VPN node in a case that the first VPN node is different from the first target VPN node.

10. The method according to claim 5, wherein an accelerable region selecting control is further displayed on the initial user interface, and the method further comprises:
switching the first target VPN node to a second VPN node in response to a selecting operation on the accelerable region selecting control, wherein
the second VPN node is a VPN node corresponding to an acceleration region selected by the selecting operation.

11. The method according to claim 1, further comprising:
displaying first network data processing information on the initial user interface.

12. The method according to claim 1, further comprising:
displaying first network data processing information in a status bar in response to a viewing operation on the status bar.

13. The method according to claim 1, further comprising:
displaying first network data processing information in a system notification message in response to a viewing operation on the notification message.

14. The method according to claim 1, further comprising:
displaying real-time network status information on the initial user interface.

15. The method according to claim 1, further comprising:
displaying summarystatistical information of this network data processing on the initial user interface in response to an acceleration stop operation.

16. The method according to claim 1, wherein the operating system authority comprises at least one of:
a VPN authority,
a storage authority, or
an application survival authority.

17. A network dataset processing apparatus, comprising:
a display; and
one or more processors configured to:
generate an initial user interface on the display, wherein the initial user interface is configured to access at least one network dataset;
use a network dataset selected from the at least one network dataset as a target network dataset in response to a selecting operation on the at least one network dataset dataset, wherein the target network dataset comprises an application that is selected to be accessed in response to the selecting operation;
determine a first target virtual private network (VPN) node corresponding to the target network dataset in response to an access operation on the target network dataset; and
establish an accelerated access channel between the terminal and the target network dataset through the first target VPN node, the first accelerated access channel having a highest access rate among a plurality of connection channels;
the display is further configured to:
switch the initial user interface to a first accelerated user interface of the application when the application is selected in response to the selecting operation, wherein
first network data processing information is displayed on the first accelerated user interface, and
the first network data processing information is used for indicating that the accelerated access channel is used for accessing the target network dataset;
determine whether a network data acceleration processing function obtains an operating system authority in response to a starting operation on the network data acceleration processing function;

display an authorization interface of the operating system authority in a case that the network data acceleration processing function does not obtain the operating system authority; and grant the operating system authority to the network data acceleration processing function in response to an authorization operation on the authorization interface.

18. A computer device, comprising a memory and one or more processors, wherein computer-readable instructions are stored in the memory and configure the one or more processors to execute the method of claim 1.

19. One or more non-transitory readable storage media storing computer-readable instructions, wherein the computer-readable instructions, when executed by one or more processors, cause the one or more processors to perform the operations of the method according to claim 1.

* * * * *